US012486937B2

(12) United States Patent
Bateman

(10) Patent No.: US 12,486,937 B2
(45) Date of Patent: Dec. 2, 2025

(54) CONTROLLED BENDING DEVICE AND PIPE JUNCTION SEALING PACKER INCORPORATING SAME

(71) Applicant: IBCO PTY LTD, Coromandel East (AU)

(72) Inventor: Ian Roger Bateman, Coromandel East (AU)

(73) Assignee: IBCO PTY LTD, Coromandel East (AU)

( * ) Notice: Subject to any disclaimer, the term of this patent is extended or adjusted under 35 U.S.C. 154(b) by 388 days.

(21) Appl. No.: 17/911,250

(22) PCT Filed: Mar. 12, 2021

(86) PCT No.: PCT/AU2021/050222
§ 371 (c)(1),
(2) Date: Sep. 13, 2022

(87) PCT Pub. No.: WO2021/179053
PCT Pub. Date: Sep. 16, 2021

(65) Prior Publication Data
US 2023/0095346 A1    Mar. 30, 2023

(30) Foreign Application Priority Data

Mar. 13, 2020 (AU) ................................ 2020900771

(51) Int. Cl.
*F16L 55/165* (2006.01)
*F16L 55/179* (2006.01)
(Continued)

(52) U.S. Cl.
CPC ......... *F16L 55/1654* (2013.01); *F16L 55/179* (2013.01); *F16L 55/18* (2013.01); *F16L 55/265* (2013.01); *F16L 2101/18* (2013.01)

(58) Field of Classification Search
CPC ... F16L 55/1654; F16L 55/179; F16L 55/265; F16L 55/18; F16L 2101/18
(Continued)

(56) References Cited

U.S. PATENT DOCUMENTS 8,801,329 B2 * 8/2014 Bateman ............... F16L 55/165
264/269
10,486,206 B2 11/2019 Carson
(Continued)

FOREIGN PATENT DOCUMENTS

AU    2003244547 B1    2/2004
EP    1 632 706 A1     3/2006
(Continued)

OTHER PUBLICATIONS

Jul. 18, 2023 Extended European Search Report issued in European Patent Application No. 21766891.2.
(Continued)

*Primary Examiner* — David R Deal
(74) *Attorney, Agent, or Firm* — Williams Mullen; R. Brian Drozd

(57) ABSTRACT

A controlled bending device in the form of an elongate member including a series of blocks configured to direct and/or control an extent of bending of the elongate member. The present invention further relates to a sealing packer for use in installing a flexible liner into a junction between a main pipe and a branch pipe, the sealing packer incorporating the bending device in a flexible lateral arm thereof to facilitate guidance of the flexible lateral arm into the branch pipe when the sealing packer is inserted (pushed or pulled) through the main pipe.

18 Claims, 18 Drawing Sheets

(51) Int. Cl.
  *F16L 55/18*    (2006.01)
  *F16L 55/26*    (2006.01)
  *F16L 101/18*   (2006.01)
(58) Field of Classification Search
  USPC ..................................................... 138/97, 98
  See application file for complete search history.

(56) References Cited

U.S. PATENT DOCUMENTS

2005/0133105 A1   6/2005  Criffo'
2010/0228295 A1   9/2010  Whitefield
2015/0330551 A1*  11/2015 Van Nie .................. F16L 58/04
                                                      73/592

FOREIGN PATENT DOCUMENTS

| EP | 3 031 539 A1 | 6/2016 |
| GB | 2380237 A | 4/2003 |
| GB | 2492460 A | 1/2013 |
| JP | S63-168087 U | 11/1988 |

OTHER PUBLICATIONS

May 3, 2021 International Search Report issued in International Patent Application No. PCT/AU2021/050222.

May 3, 2021 Written Opinion issued in International Patent Application No. PCT/AU2021/050222.

Mar. 16, 2022 International Preliminary Report on Patentability issued in International Patent Application No. PCT/AU2021/050222.

* cited by examiner

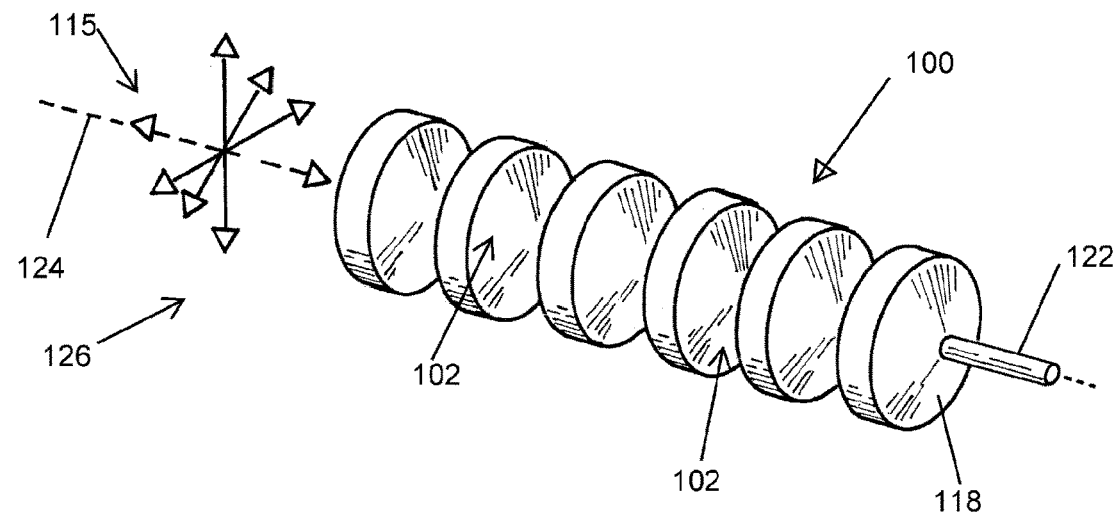
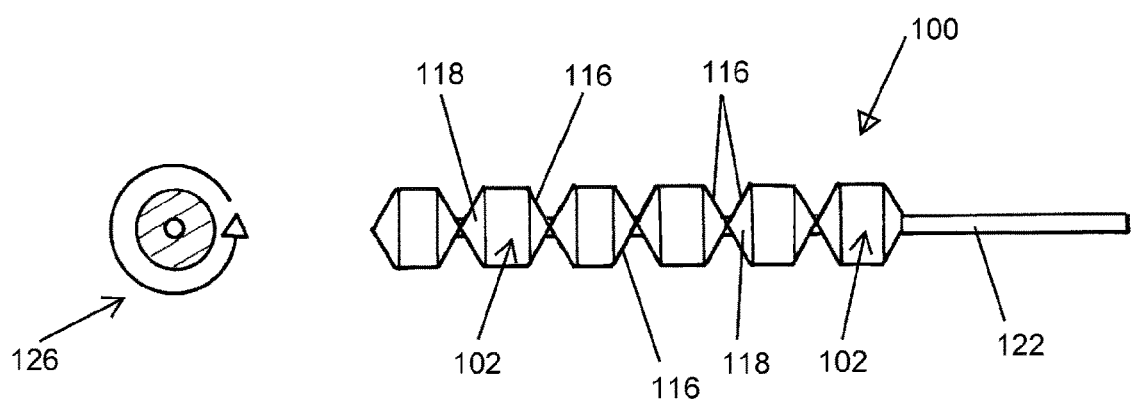
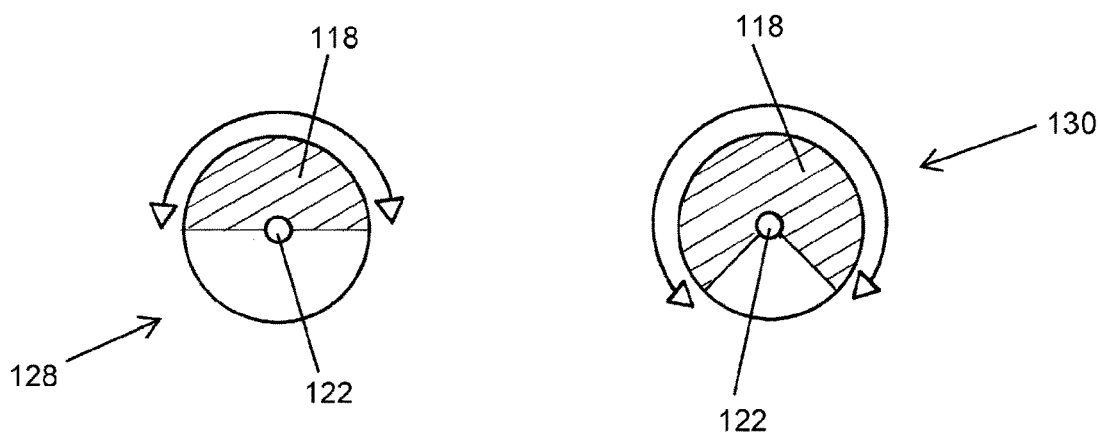
Figure 5

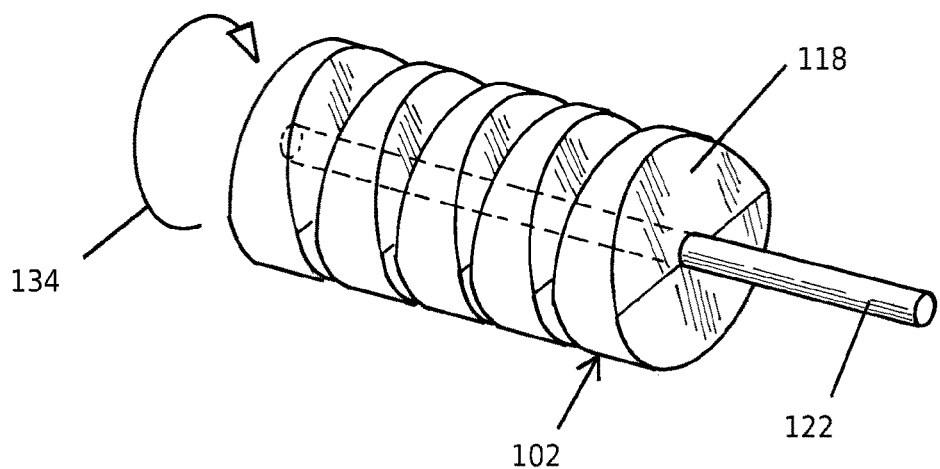
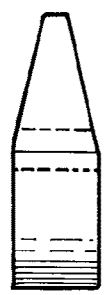 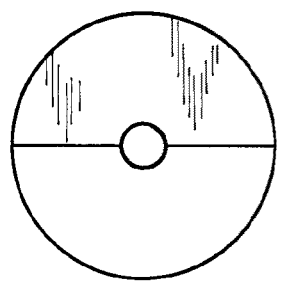
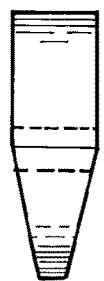 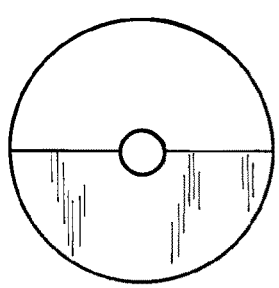
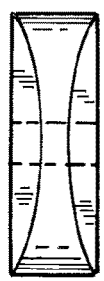 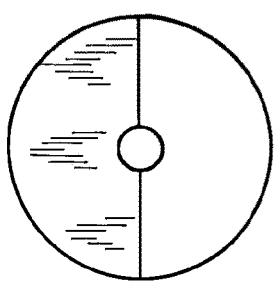
Figure 7

CONTROLLED BENDING DEVICE AND PIPE JUNCTION SEALING PACKER INCORPORATING SAME

FIELD OF THE INVENTION

The present invention relates to a controlled bending device in the form of an elongate member, such as a bar or rod, including a series of blocks configured to direct and/or control an extent of bending of the elongate member. The present invention further relates to a sealing packer for use in installing a flexible liner into a junction between a main pipe and a branch pipe, the sealing packer incorporating the bending device in a flexible lateral arm thereof to facilitate guidance of the flexible lateral arm into the branch pipe when the sealing packer is inserted (pushed or pulled) through the main pipe.

BACKGROUND OF THE INVENTION

There exist multiple scenarios in which access to a confined location is difficult or impossible for a human, and such scenarios often require the use of suitably shaped and sized mechanical apparatus to access the location and perform necessary tasks. One example is a pipe (or vessel) including sections that require monitoring and/or repair but being located and/or shaped to prevent human access. Navigating through a straight section of pipe is relatively straightforward, but challenges arise when an elongate member is required to navigate through one or more pipe bends since there is a risk the elongate member is too rigid and hence may not sufficiently bend, or is not rigid enough and hence may buckle. The Applicant has recognized a need for facilitating navigation through one or more bends in a pipe or vessel.

In domestic sewage collection systems, there is regularly a need to repair the lateral connection between house service pipes and the sewer main. In order to avoid digging into soil or breaking up concrete or the like, an installation apparatus (also referred to herein as a "sealing packer" or "packer" or "packer assembly") is typically pushed (or pulled) through a sewer main extending between human access chambers, and the lateral connection is sealed using an inflatable sleeve that positions a resin-impregnated liner material into the junction. The junction shapes are typically 90 degree tees or 45 degree wyes.

FIGS. 1-3 show an example of a prior art packer assembly 10 used to apply a textile liner 60 impregnated with resin to an internal connecting region 11 between a sewer main 12 and a house service line 13.

The assembly 10 includes a main body 14 and a lateral arm 15 which extends outwardly from the main body portion 14 intermediate its ends. The main body 14 has end ring flanges 16 located at both ends. The lateral arm 15 has at its distal end a guide means, typically in the form of a launcher 17, which acts as a guide for positioning of the lateral arm 15. The launcher 17 is pivotally attached to the lateral arm 15 through use of a flexible rod (not shown) which extends inside the main body 14 from one of the end ring flanges 16 to which it is fixed, through the lateral arm 15 to the launcher 17, which itself is pivotally connected to the free end of the flexible rod.

A lateral arm restrainer cable (not shown) is also connected between the launcher 17 and end ring flange 16 to prevent the launcher from becoming detached. Further, the launcher 17 has a pair of rollers 26 to assist in its movement. The free end 26 of the launcher 17 is resiliently moveable with respect to the main body 14 such that, in use within the main pipe 12, the wheels 26 press against the inside wall 12' of the main pipe 12 to provide a lead-in into the target branch pipe 13. The resilient movement of the wheels 26 with respect to the inside wall 12' is achieved through use of a spring (not shown) associated with steel plate 25 which is pivotally mounted to a ring flange 16', the steel plate 25 supporting the rollers 26. In other words, the spring (not shown) is arranged to pivotally pull the free end 26 of the launcher 17 into contact with the inside wall of the main pipe 12.

A stiffening rod 30 is also shown in FIG. 1 and is adapted to be secured to the inside of the hose 19 to assist in rigidity. Also shown is a rod connector adaptor 31 secured to the end ring flanges 16 and used to connect push rods (not shown) to the packer assembly 10 to allow it to be maneuvered into position and subsequently removed. Closed-Circuit TeleVision (CCTV) cameras (not shown) are used to assist in the movement of the assembly and an electric power lead 32 is used to power the cameras and light source required.

The packer 10 is pushed (or pulled) along the main pipe 12 until it reaches the target junction. As described above, the provision of a spring-biased launcher 17 at the distal end of lateral arm 15 provides an automatic lead-in into the target branch pipe 13 and thereby enables the operator to insert the liner 60 into position by pushing (or pulling) the packer assembly 10 through the main pipe 12 using the push rods (not shown). In particular, when at the junction, the packer 10 is positioned such that the distal end of the lateral arm 15 is located centrally in the junction opening. The packer 10 is then pushed (or pulled) a known distance and the lateral arm 15 moves up the junction to its "home position" (i.e. the position shown in FIG. 1).

An inflatable sleeve 18 forms the outer surface of the main body 14 and lateral arm 15, and is secured at its ends by bands 28. Air hose connectors 29 are located at both the ends of the end ring flanges 16 and are adapted to be used to input air from an air hose (not illustrated) into a cavity inside the sleeve 18 in the main body 14 and within the lateral arm 15. Once the packer assembly 10 has been moved into the correct position, the air supply can be input from either end as required. The packer assembly 10 is inflated and the resin-impregnated liner 60 is pressed against the interior of the main 12, the interior 13' of the house service line 13, at the connecting region 11.

FIG. 2 shows the packer assembly 10 and liner 60, with the sleeve 18 associated with each of the main body 14 and lateral arm 15 inflated. While the inflatable sleeve 18 is expanded to the size of the main 12 and the house service line 13, the resin is allowed to cure. The sleeve 18 remains inflated until the resin is cured and then the packer 10 is deflated and dislodged from the liner 60, and removed from the main 12 as is shown in FIG. 3. Remaining in place is the cured (hardened) liner 60, hence the connecting region 11 between the main pipe 12 and house service line 13 is repaired.

The Applicant has recognized two significant problems with the apparatus 10 shown in FIGS. 1-3 and described above. These are outlined in greater detail in the paragraphs that follow.

1. Auto-Locating the Lateral Arm

It can be appreciated that there is considerable benefit in having a packer that auto-locates itself into the junction opening, and it should be clear to the reader how launcher 17 acts as a 'guide means' which springs up into the junction opening once the opening is encountered.

The lateral arm 15 of packer 10 more or less rests on the main body 14 of the packer 10. On the distal end of the lateral arm 15 is the spring-loaded launcher 17 which includes a steel plate 25 that is hinged in that it is pivotally connected to the distal end of the lateral arm 15. The distal end of the steel plate 25 is spring-loaded, and the spring (not shown) on the inside of the plate 25 acts to "close" the plate, i.e. rotate it back towards the lateral arm 15. However, the inside wall 12' of the pipe 12 prevents such rotation, and when inserted the guide means 17 will close until it touches the inside wall 12'. At this point, there is a net force (frictional) acting on the inside wall 12'. When the packer 10 reaches a junction opening, the rollers 26 at the end of the plate 25 enter into the opening and thereby allow the plate 25 to close further, which allows the guide means 17 to enter the junction and create a "catch" on the junction.

A problem with the guide means or launcher 17 of assembly 10 is that it constitutes a large, complex mechanism that protrudes and is not shielded. Accordingly, during insertion and removal of the lateral arm 15 through pipes 12 and 13, there is a risk that the mechanism 17 will become caught, trapped and/or damaged. In this regard, the distal end of the lateral arm 15 is effectively the "leading" part of packer 10 and as such, can get caught or snagged on offsets, displacement, cracks and debris.

Furthermore, having such a large attachment at the distal end of the lateral arm 15 increases the overall size of the apparatus 10 which is not desirable since the apparatus 10 is required to manoeuvre small diameter pipes.

2. Bending of the Lateral Arm

Once the lateral arm 15 has "caught" the lateral opening, it must be pushed (or pulled) up into the junction pipe 13. The technical challenge at this point is to have a lateral arm 15 that is able to bend along its length and enable the arm 15 to travel up the junction pipe 13. In the most severe case, this will involve bending through 90 degrees. It is therefore evident that the lateral arm 15 must be flexible in its axial direction.

As mentioned above, apparatus 10 includes a flexible rod (not shown) which extends inside the main body 14 from one of the end ring flanges 16, to which it is fixed, through the lateral arm 15 to the launcher 17. In most cases, the flexible rod is a spring. The spring size and gauge is selected to provide sufficient bending resistance to avoid buckling, but not too much resistance as to make the force required to bend it too great. In other words, if the spring is too rigid, the lateral arm will not bend after the launcher 17 auto-locates in the pipe junction 13, hence the lateral arm is unable to properly move into the junction pipe 13. If the spring rigidity is too low, the spring will bend and buckle inside the lateral arm 15, again preventing the lateral arm 15 from properly moving into the junction pipe 13. It would be appreciated by those skilled in the art that in both scenarios, the packer 10 will not be able to be positioned properly in the pipe junction and will have to be removed from the main 12.

Another way of achieving the same result as a spring is to use a spring steel rod or bar, but again, the thickness and properties of the rod/bar need to be selected to achieve an optimum balance between buckling and bending force.

In practice, using either one of a spring or a steel rod/bar in the lateral arm 15 of a packer 10 to provide rigidity to the lateral arm 15 and avoid buckling during insertion of the lateral arm 15 into junction pipe 13 generally requires excessive force to insert the arm 15 into the lateral pipe 13. Diagram 64 of FIG. 4 shows a conventional spring being bent at an angle D based upon application of a bending force, and graph 66 of FIG. 4 shows the directly proportional relationship between angle ϕ and the bending force required to bend the conventional spring. In this regard, it will be appreciated that the above problems are exacerbated when the lateral arm extends at larger angles such as 90 degrees from the main 12. In quantitative terms, pushing (or pulling) forces of approximately 30 to 50 kilograms (kg) may be required to cause the lateral arm 15 to move up the junction pipe 13 when using conventional springs or steel rods/bars, hence the action of pushing or pulling the apparatus to guide the arm 13 into the lateral pipe 13 can prove difficult for humans. The Applicant has recognised a need for a mechanism that allows the lateral arm 15 to enter and move up the junction pipe 13 using a minimum of force.

It is an object of the present invention to overcome at least some of the aforementioned problems or to provide the public with a useful alternative.

SUMMARY OF THE INVENTION

In one aspect, the present invention provides an elongate member that is flexible in its axial direction to enable the elongate member to navigate a bend in a vessel, the elongate member including a plurality of blocks that are spaced lengthwise along the elongate member and configured such that adjacent blocks, during bending of the elongate member, interact to control a degree and/or direction of bending of the elongate member.

In an embodiment, each block is substantially trapezoidal from a side perspective such that each block include a tapered surface configured to allow the elongate member to bend, from a starting position, in a direction that causes the tapered surfaces of adjacent blocks to rotate toward one another until the tapered surfaces abut, at which point a maximum degree of bending is achieved.

In an embodiment, said maximum degree of bending is achieved at a radius of curvature that is defined by an angle of the interacting tapered surfaces when in said starting position.

In an embodiment, a force is required to bend the elongate member up to the radius of curvature, at which point the force is infinite. As a result, a very low bending force is required to bend the lateral arm, but once it reaches the point where the blocks are in contact no further bending or buckling is possible.

In an embodiment, the elongate member is a rod and each block is substantially donut-shaped and journals around the rod.

In an embodiment, said tapered surface associated with each donut-shaped block extends a minimum of 180 degrees and a maximum of 360 degrees around the rod.

In an embodiment, said tapered surface journals 360 degrees around the rod such that the elongate member is capable of three-dimensional bending.

In an embodiment, said tapered surface journals 270 degrees around the rod such that the elongate member is capable of bending in two dimensions.

In an embodiment, said tapered surface journals 180 degrees around the rod such that the elongate member is capable of bending in one dimension, the direction of bending based upon an orientation of the donut-shaped block about the rod.

In an embodiment, the orientation of each donut-shaped block about the rod is adjustable by rotating the block about the rod.

In an embodiment, the elongate member is a bar having a planar upper and lower surface, wherein each block is connected to one or both of the upper and lower surfaces and has a substantially square or rectangular shape when viewed from a top perspective.

In an embodiment, the bar includes blocks along the upper or lower surface only, and the angle of tapered surfaces associated with adjacent blocks is equal, such that when a bending force is applied the bar will bend in a single direction to a single radius of curvature defined by the angle of the tapered surfaces. In this embodiment, the bar will be capable of bending along one axis of movement.

In an embodiment, the bar includes a leading section having a first set of blocks and a trailing section having a second set of blocks, such that when a bending force is applied the leading section will bend to a first radius of curvature defined by an angle of the tapered surfaces associated with the leading set of blocks, and the trailing section will bend to a second radius of curvature defined by an angle of the tapered surfaces associated with the trailing set of blocks, wherein the first radius of curvature is different to the second radius of curvature. In this embodiment, the bar will be capable of bending along one axis of movement.

In an embodiment, the bar includes a leading section having a first set of blocks connected to the upper surface, and a trailing section having a second set of blocks connected to the lower surface, such that when a bending force is applied the leading section will bend to a radius of curvature defined by an angle of the tapered surfaces associated with the leading set of blocks, and subsequently, the trailing section will bend in an opposite direction to a radius of curvature defined by an angle of the tapered surfaces associated with the trailing set of blocks. In this embodiment, the bar will be capable of bending along two axes of movement.

According to a further aspect, the present invention provides a bending device for use in a pipe liner installation apparatus, the bending device including an elongate member configured in accordance with any one of the preceding statements.

According to a yet further aspect, the present invention provide a pipe liner installation apparatus for installing a flexible liner into an internal connecting region between a main pipe and a target branch pipe, the apparatus including a lateral arm incorporating a bending device configured in accordance with the immediately preceding statement.

According to yet another aspect, the present invention provides a pipe liner installation apparatus for installing a flexible liner into an internal connecting region between a main pipe and a target branch pipe, the apparatus deployable from within the main pipe and including an elongate body, a lateral arm including a proximal end connected to the body, a distal end, and a bending device including an elongate member extending between the proximal and distal ends, the elongate member being flexible in its axial direction to enable the lateral arm to navigate a bend into the target branch pipe during pushing or pulling of the body lengthwise with respect to the main pipe, and a plurality of blocks that are spaced lengthwise along the elongate member and configured such that adjacent blocks, during bending of the elongate member, interact to control a degree and/or direction of bending of the lateral arm, and an inflatable sleeve assembly extending at least partially over the body and the lateral arm.

In an embodiment, each block is substantially trapezoidal from a side perspective such that each block includes a tapered surface configured to allow the elongate member to bend, from a starting position, in a direction that causes the tapered surfaces of adjacent blocks to rotate toward one another until the tapered surfaces abut, at which point a maximum degree of bending is achieved.

In an embodiment, said maximum degree of bending is achieved at a radius of curvature that is defined by an angle of the interacting tapered surfaces when in said starting position.

In an embodiment, a force is required to bend the elongate member up to the radius of curvature, at which point the force is infinite. As a result, a very low bending force is required during pushing or pulling of the body lengthwise with respect to the main pipe, but once it reaches the point where the blocks are in contact no further bending or buckling is possible.

In an embodiment, the elongate member is a rod and each block is substantially donut-shaped and journals around the rod.

In an embodiment, said tapered surface associated with each donut-shaped block extends a minimum of 180 degrees and a maximum of 360 degrees around the rod.

In an embodiment, said tapered surface journals 360 degrees around the rod such that the elongate member is capable of bending in all directions.

In an embodiment, said tapered surface journals 180 degrees around the rod such that the elongate member is capable of bending in one dimension, the direction of bending based upon an orientation of the donut-shaped block about the rod.

In an embodiment, the orientation of each donut-shaped block about the rod is adjustable by rotating the block about the rod.

In an embodiment, the elongate member is a bar having a planar upper and lower surface, wherein each block is connected to one or both of the upper and lower surfaces and has a substantially square or rectangular shape when viewed from a top perspective.

In an embodiment, the bar includes blocks along the upper or lower surface only, and the angle of each lateral edge tapered surface is equal, such that when a bending force is applied the bar will bend in a single direction to a single radius of curvature defined by the angle of the tapered surfaces.

In an embodiment, the bar includes a leading section having a first set of blocks and a trailing section having a second set of blocks, such that when a bending force is applied the leading section will bend to a first radius of curvature defined by an angle of the tapered surfaces associated with the leading set of blocks, and the trailing section will bend to a second radius of curvature defined by an angle of the tapered surfaces associated with the trailing set of blocks, wherein the first radius of curvature is different to the second radius of curvature.

In an embodiment, the bar includes a leading section having a first set of blocks connected to the upper surface and a trailing section having a second set of blocks connected to the lower surface, such that when a bending force is applied the leading section will bend to a radius of curvature defined by an angle of the tapered surfaces associated with the leading set of blocks, and subsequently, the trailing section will bend in an opposite direction to a radius of curvature defined by an angle of the tapered surfaces associated with the trailing set of blocks.

In an embodiment, the bending device further includes one or more biasing means that cause the elongate member to be biased in a direction that causes a distal end of the lateral arm to provide a lead-in for the distal end of the lateral arm into the target branch pipe under the external action of pushing or pulling of the body lengthwise with respect to the main pipe.

Accordingly, the elongate member not only controls a direction and/or degree of bending of the lateral arm, but may be configured to further ensure the lateral arm catches and enters into the junction.

In an embodiment, the one or more biasing means is one or more springs extending between two blocks of the plurality of blocks associated with the elongate member.

In an embodiment, a distal end of the lateral arm further includes a protruding nose having a contact surface shaped to facilitate movement over obstacles encountered by the distal end of the lateral arm along an inside wall of the main and/or target branch pipes.

In an embodiment, the contact surface includes a radius of curvature.

In an embodiment, the inflatable sleeve assembly includes a single bifurcated sleeve substantially covering both the body and the lateral arm.

In an embodiment, the body includes a hollow pipe, the hollow pipe allowing transmission of fluid through the apparatus while in use.

In an embodiment, the liner includes textile material impregnable with resin.

According to a further aspect, the present invention provides a method of installing a flexible liner into a junction between a main pipe and a branch pipe, the method including the steps of fitting the flexible liner over an installation apparatus, the apparatus including an elongate body, a lateral arm including a proximal end connected to the body, a distal end, a bending device including an elongate member extending between the proximal and distal ends, the elongate member being flexible in its axial direction to enable the lateral arm to navigate a bend into the target branch pipe during pushing or pulling of the body lengthwise with respect to the main pipe, and a plurality of blocks that are spaced lengthwise along the elongate member and configured such that adjacent blocks, during bending of the elongate member, interact to control a degree and/or direction of bending of the lateral arm, and an inflatable sleeve assembly extending at least partially over the body and the lateral arm, inserting the installation apparatus and fitted liner into the main pipe via an access opening, pushing or pulling the installation apparatus and fitted liner along the main pipe towards an entrance to the branch pipe, further pushing or pulling the installation apparatus and fitted liner along the main pipe so that the lateral arm is driven through the entrance of the branch pipe into the branch pipe, wherein the degree and/or direction of bending of the lateral arm when navigating the bend into the branch pipe is based upon the configuration of the plurality of blocks and interaction therebetween, inflating the sleeve so as to press the fitted liner against the inner walls of both the main pipe and the branch pipe until the liner is fixed in place, deflating the sleeve, and withdrawing the installation apparatus from within the liner fixed within the branch and main pipes.

In an embodiment, the method further includes impregnating the liner with a resin, the resin curable to form a bond between the liner and the inner walls of both the main pipe and the branch pipe, wherein the impregnating step occurs before said inserting step.

In an embodiment, the method further includes rotating the main body thereby rotating the lateral arm so as to align it with an entrance to the branch pipe, wherein the rotating step occurs before said further pushing or pulling step.

In a still further aspect, the present invention provides a packer assembly for repairing a connection joint between two pipes, said packer assembly adapted to be inserted into said joint and adjacent portions of said pipes, said packer assembly including a flexible elongate main body portion having a first end and a second end, a flexible lateral arm portion with a proximal end connected to the main body portion intermediate the ends of the main body portion and a distal end extending outwardly from said main body portion intermediate the ends of the main body portion, the lateral arm further including a bending device including an elongate member extending between the proximal and distal ends, the elongate member being flexible in its axial direction and biased to enable the lateral arm to navigate a bend into the target branch pipe during pushing or pulling of the body lengthwise with respect to the main pipe, and a plurality of blocks that are spaced lengthwise along the elongate member and configured such that adjacent blocks, during bending of the elongate member, interact to control a degree and/or direction of bending of the lateral arm, and a biasing means that cause the elongate member and hence the lateral arm to be biased in a direction that causes a distal end of the lateral arm to provide a lead-in for the distal end of the lateral arm into the target branch pipe during pushing or pulling of the body lengthwise with respect to the main pipe. and an inflatable sleeve means extending at least partially over the main body portion and the lateral arm portion, said packer assembly being adapted to have a pipe liner fitted over said inflatable sleeve means, said pipe liner being adapted to be applied to interior surfaces of said pipes and said connection joint when said sleeve means is inflated after the packer assembly is inserted into position, and after said pipe liner has been applied to the interior surfaces, said packer assembly is adapted to be removed, wherein said packer assembly is inserted into one of the pipes with the lateral arm portion being substantially side by side with the main body portion, the packer assembly being pushed or pulled towards said connection joint whereby the lateral arm portion is guided into the other pipe by the biased lateral arm to thereby change its orientation to that of the orientation of the pipe when the lateral arm portion is in position, the inflatable sleeve means is inflated such that the pipe liner abuts against the interior surfaces of the connection joint and pipes.

BRIEF DESCRIPTION OF THE DRAWINGS

Features of the present disclosure are illustrated by way of example and not limited in the following figure(s), in which like numerals indicate like elements, in which:

FIG. 5 illustrates multiple views of controlled bending devices according to different embodiments in which an elongate member includes a plurality of donut-shaped blocks journaling a rod, each block having a lateral edge defined by a tapered surface that extends at least 180 degrees around the rod.

FIG. 7 illustrates multiple views of a controlled bending device that enables rotation of each block such that the blocks may be oriented to allow bending in a particular direction.

DETAILED DESCRIPTION OF EMBODIMENT(S) OF THE INVENTION

Figure 1:
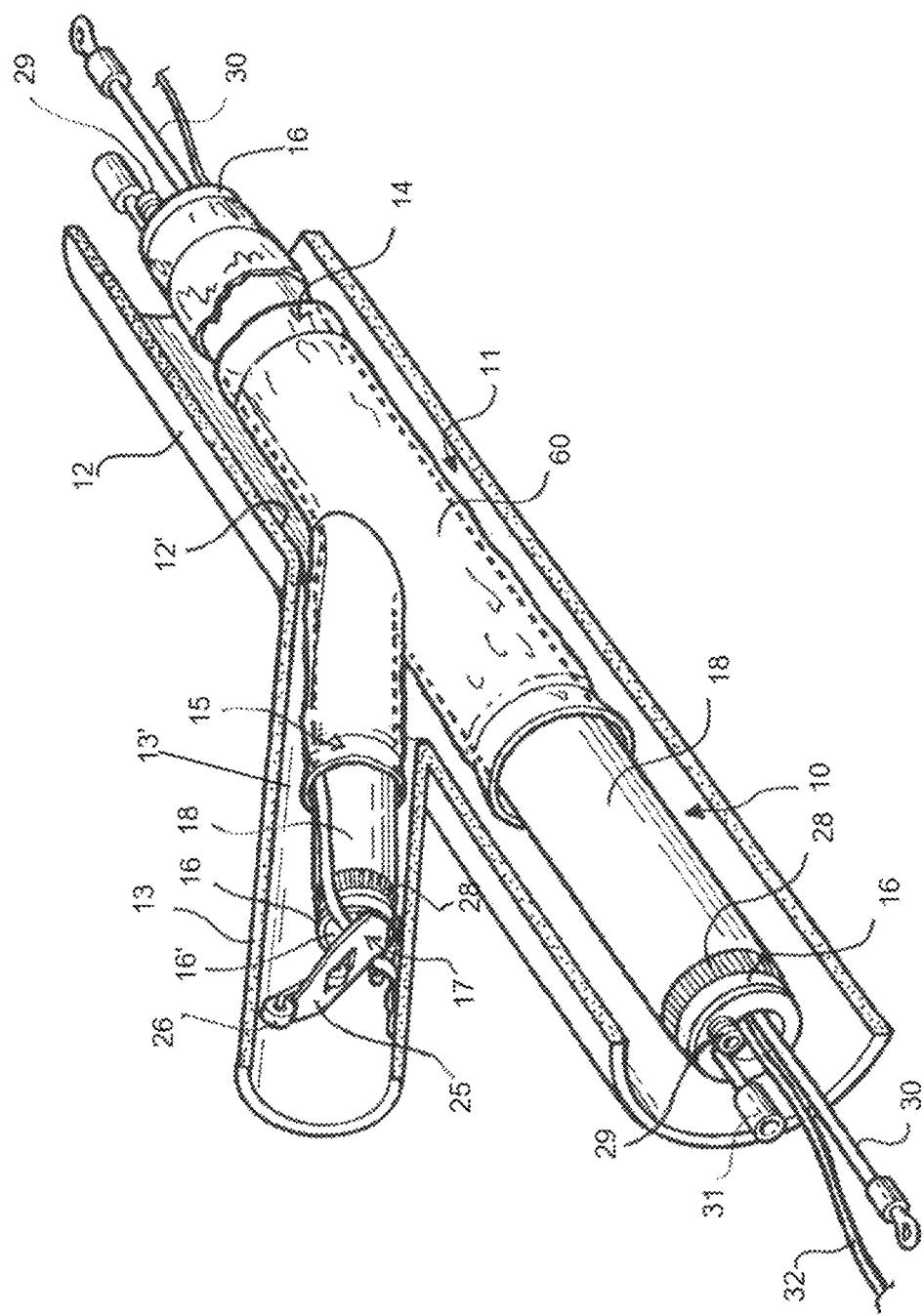
FIG. 1 illustrates a perspective view of a prior art packer assembly in position within a main pipe and a branch pipe.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

The present invention relates to a controlled bending device (100) and, in particular, to a device (100) including an elongate member (122, 142) and a plurality of associated blocks (102) that control a degree and/or direction of bending of the elongate member (122, 142), the elongate member (122, 142) being sufficiently resilient to allow the device (100) to return to a starting position after being bent. In a particular embodiment, the present invention relates to the use of such a device (100) in a lateral arm (104) associated with a pipe liner installation apparatus (106), to direct and control bending of the lateral arm (104). The apparatus 106, once in the home position, is used to inflate a sleeve 107 which causes a flexible, resin-impregnated liner 108 to be installed into an internal connecting region 110 between a main pipe 112 and a target branch pipe 114.

The elongate member 100 is flexible in its axial direction meaning that, as shown in FIG. 5, the elongate member (100) is flexible and a leading end, for example, is capable of travelling in one or more directions (115) away from the longitudinal axis (124) whilst another part of the member (100), e.g. the trailing end, remains aligned with the longitudinal axis (124). This flexibility enables the elongate member 100 to navigate a bend in a vessel (such as main pipe 112 and branch pipe 114). The elongate member 100 includes a plurality of blocks 102 that are spaced lengthwise along the elongate member 100 and configured such that adjacent blocks 102, during bending of the elongate member 100, interact to control a degree of bending of the elongate member 100.

As shown in the embodiments of FIGS. 5-10, each block 102 may be substantially trapezoidal from a side perspective with lateral edges 116 of each block 102 defined by a tapered surface 118 configured to allow the elongate member (122, 142) to bend. When a bending force is applied, the elongate member (100) will bend in a direction that causes the tapered surfaces 118 of adjacent blocks 102 to rotate toward one another until the tapered surfaces 118 abut, at which point a maximum degree of bending is achieved. The skilled addressee will appreciate that the radius of curvature when the blocks are at a maximum degree of bending is defined by the angle of the lateral edges 116, i.e. the size and shape of the V-shape between the two adjacent tapered edges 116. For example, as shown most clearly in FIG. 8, the greater the V angle, the smaller the radius of curvature becomes.

Figure 6:
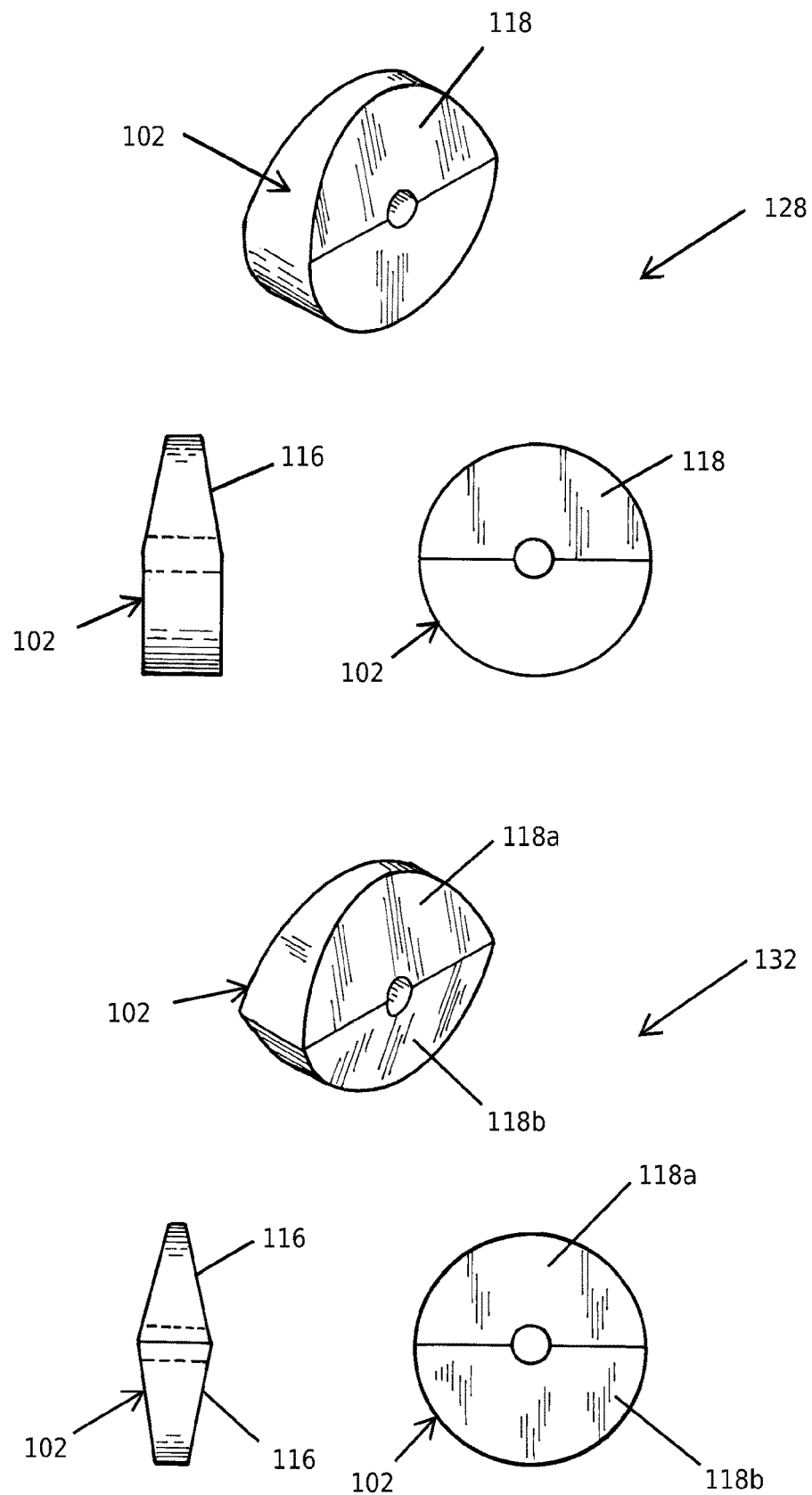
FIG. 6 illustrates multiple views of additional donut-shaped block embodiments.

As will become apparent, where a block (102) or a radial portion of a block (102) is rectangular rather than trapezoidal, as shown in the lower radial portion of the block 102 of example 128 shown in FIG. 6, then no bending is possible in that direction.

Figure 4:
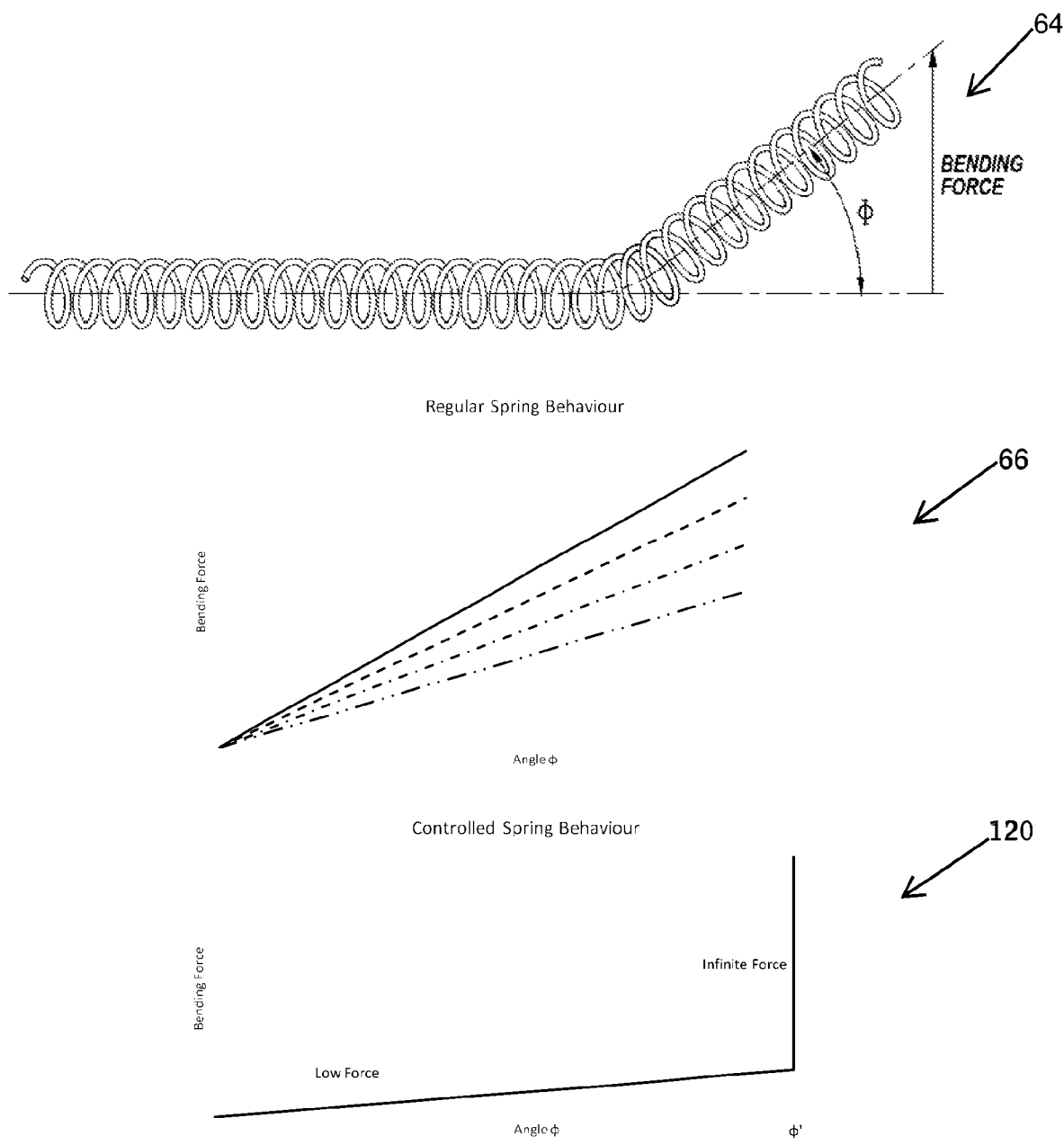
FIG. 4 illustrates a spring with a bending force applied and two associated graphs relating to regular and controlled spring behaviour.

The graph 120 of FIG. 4 shows that a bending force is required to bend the elongate member (122, 142) up to a maximum angle $\phi'$ relating to the particular radius of curvature when the blocks are at a maximum degree of bending, at which point the force is infinite. This configuration gives rise to various benefits. When used in the lateral arm 104, for example, a very low bending force is required to bend the lateral arm 104, but once it reaches the point where the blocks 102 are in contact, no further bending or buckling is possible.

In the embodiments shown in FIGS. 5-7, the elongate member (122) is a cylindrical rod 122 having a longitudinal axis 124 and each block 102 is substantially donut-shaped and journals around the rod 122. The example 126 of FIG. 5 involves a tapered surface 118 extending 360 degrees around the rod 122 to define lateral edge 116 which allows the elongate member 122 to bend in multiple directions 115.

FIG. 5 also shows an example 128 of where the tapered surface 118 of each block 102 extends 180 degrees around the rod 122 such that the elongate member 122 is capable of bending in a single direction only depending on the orientation of the rod (e.g. left, right, up or down). This block configuration example 128 is also shown from additional views in FIG. 6.

A further example 130 is shown in FIG. 5 where the tapered surface 120 of each block 102 extends 270 degrees around the rod 122 such that the elongate member 122 is capable of bending in three directions (e.g. left, right and up, but not a fourth direction, e.g. down).

FIG. 6 shows, in example 132, yet another block variation where the block 102 includes a first taper angle associated with a first tapered surface 118a extending 180 degrees around the rod 122, and a second taper angle associated with a second tapered surface 118b extending around the remaining 180 degrees around the rod 122. This particular configuration would enable bending in one direction to one radius of curvature, and bending in the opposite direction to a different radius of curvature.

In order for bending to occur, at least 180 degrees of the block 102 must be tapered. If the taper extends any less than 180 degrees around the rod 122, bending will not be possible. In other words, the rotational degree of taper defines the planes that the elongate member 122 can bend in. For example, blocks tapered in the upper 180 degrees will only be capable of bending on a 2-dimensional plane (i.e. up). As described above, if the entire block is tapered (360 degrees) the rod is capable of bending in all planes (i.e. complete 3-dimensional bending).

The orientation of each donut-shaped block 102 may be adjustable such that each block is rotatable 134 about the rod 122, i.e. about longitudinal axis 124, as shown in FIG. 7. In the example shown, the tapered surface 118 extends 180 degrees around the rod 122 (as per example 128) which means the elongate member 100 is capable of bending in a single direction. FIG. 7 shows, in orientation 136, the block 102 rotated to a location where the tapered surface 118 forms the upper lateral edge 116 of the block 102, thereby enabling a group of such blocks 102 oriented in this way to be rotated upwardly. In orientation 138 shown in FIG. 7, the block 102 is rotated to a location where the tapered surface 118 forms the lower lateral edge 116 of the block 102, thereby enabling a group of such blocks 102 oriented in this way to be rotated downwardly. Also shown in FIG. 7 is orientation 140 where the block 102 is rotated to a left hand side location (when viewed from an end of the block), thus forming both an upper and lower lateral edge 116 and enabling a group of such blocks 102 oriented in this way to be rotated to the left.

In a practical application (not illustrated), an elongate member 100 may include say fifty blocks 102 spaced lengthwise along a cylindrical rod 122, each in contact at the centre line. The skilled addressee will appreciate that each block 102 can be tapered such that its side profile is trapezoidal in at least half of the block. The degree of taper determines the radius of curvature of the rod. Accordingly, if the rod 122 contained fifty blocks 102 all of the same taper and all oriented (rotationally) in the same direction, the entire member 100 would bend up to a radius of curvature defined by the taper.

If each of the fifty blocks is also capable of being independently rotated on the rod, then the orientation of each rod could be altered to enable the rod 122 to bend in different directions. For example, if the blocks 102 are rotated 180 degrees, the direction of bend will be changed by 180 degrees. Likewise if the blocks are rotated 90 degrees, the direction of bend will be changed by 90 degrees. A person skilled in the art will appreciate that by rotating the blocks, the rod 122 and hence the device 100 as a whole can be made to bend in different directions based on the orientation of the blocks 102 along the rod 122.

For example, if the first set of ten blocks were oriented with taper up, the second set of ten blocks oriented with taper down, the third set of ten blocks oriented with taper to the left, fourth set of ten blocks oriented with taper to the right, and the final set of ten blocks oriented with taper up, the rod 122 would be capable of bending in a controlled sequence, i.e. upwards, then downwards, then to the left, then to the right and then upwards again (with the degree of bend still defined by the taper angles).

It is to be understood that different elongate members may be constructed to include a different number of blocks, blocks with a different degree of lateral edge taper, blocks oriented in different rotational positions, and/or blocks with different degrees of rotational taper, depending on the particular application in which the elongate member is proposed to be used.

Figure 8:
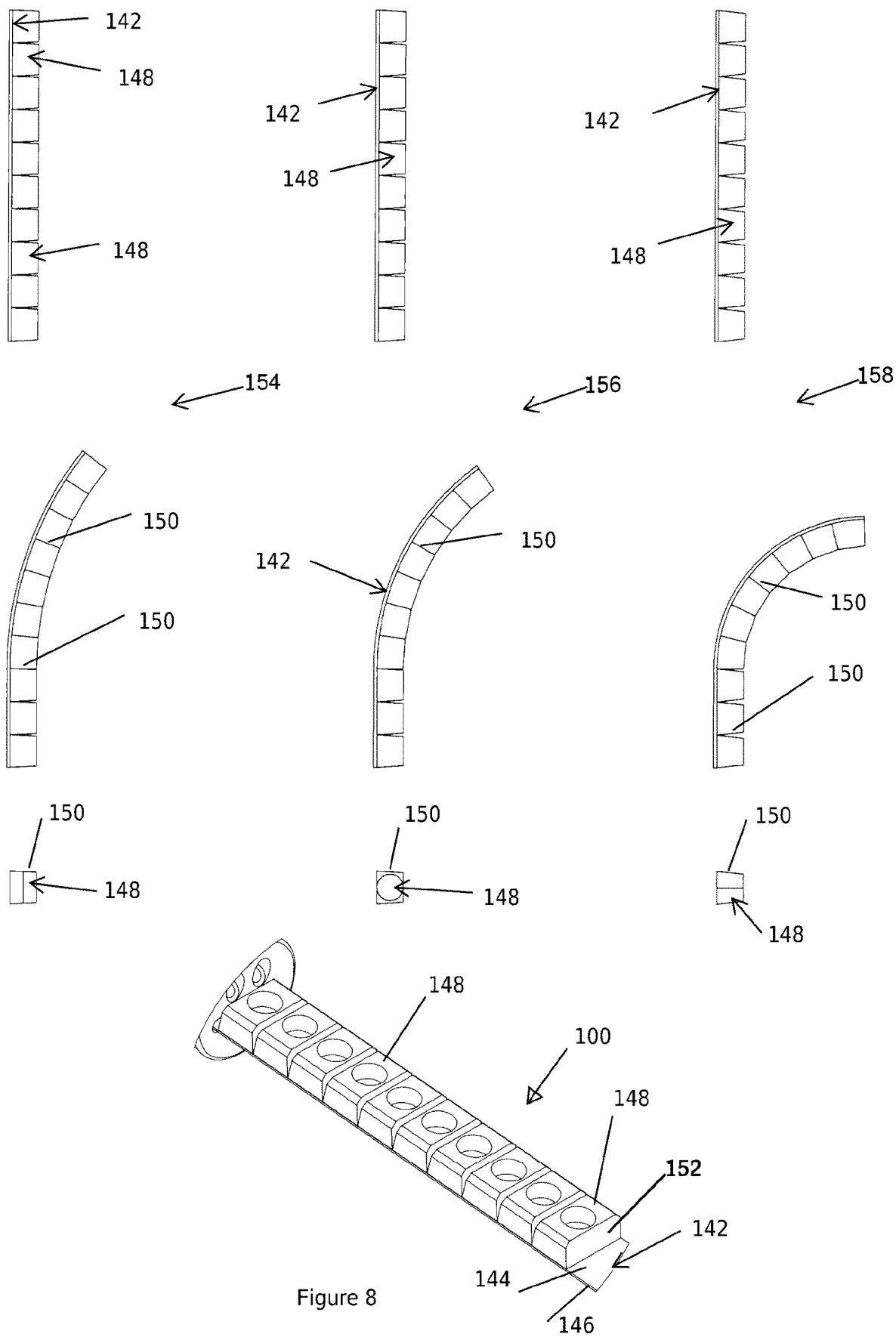
FIG. 8 illustrates multiple controlled bending device embodiments in which an elongate member includes a plurality of substantially rectangular-shaped blocks attached to a planar surface of a bar, each of the three embodiments shown relating to a different block taper angle.
Figure 9:
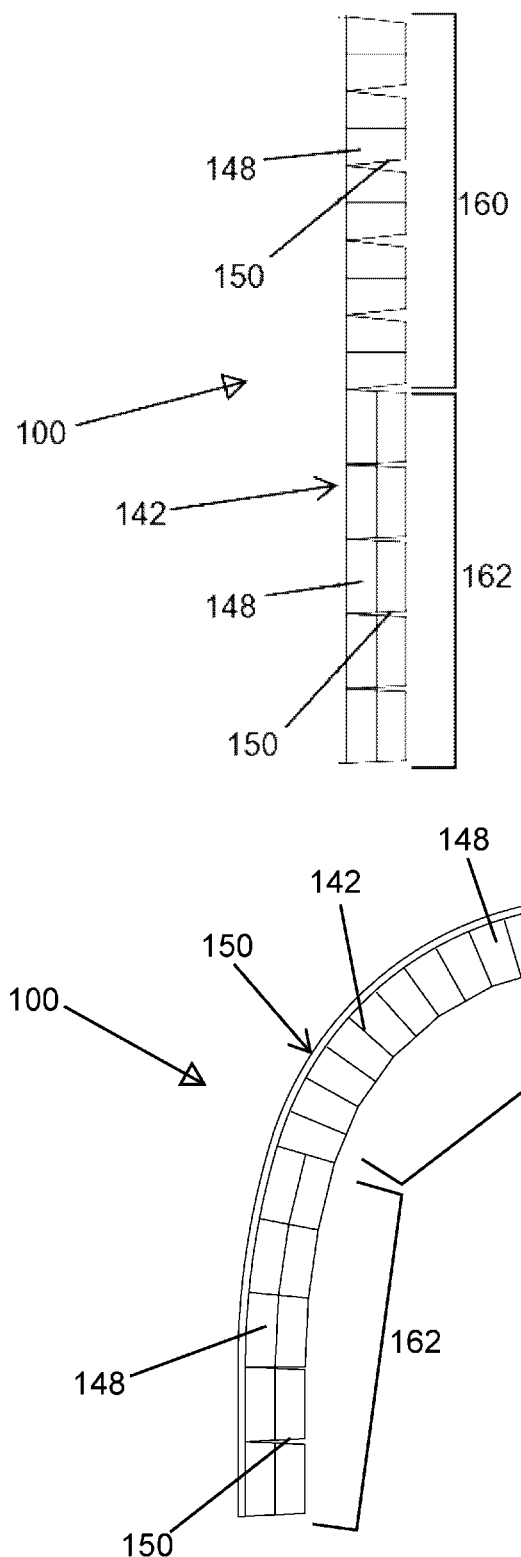
FIG. 9 illustrates an embodiment in which blocks having two different block taper angles are attached to the same elongate bar.
Figure 10:
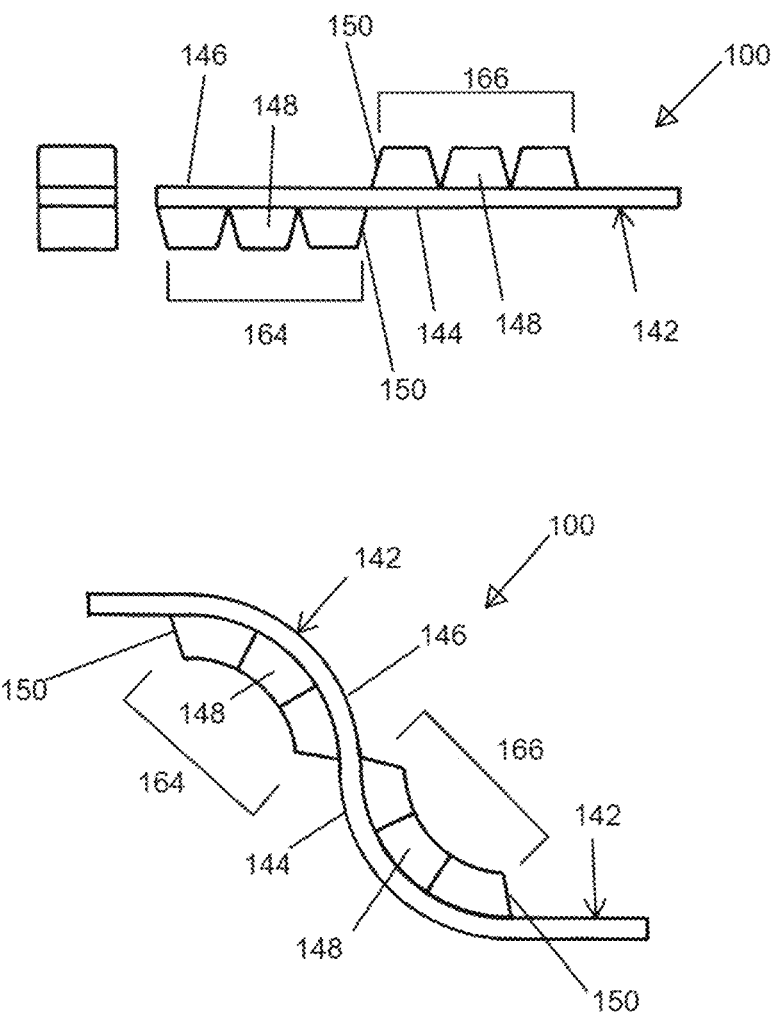
FIG. 10 illustrates an embodiment in which blocks having the same block taper angle are attached to each of an upper and a lower planar surface of the same elongate bar.

In an alternate embodiment shown in FIGS. 8-10, the elongate member 142 is in the form of a bar 142 having a planar upper 144 and a planar lower 146 surface, and blocks 148 connected to one or both of the upper and lower surfaces. The blocks 148 may have a substantially square or rectangular profile (when viewed from a top perspective) and a trapezoidal profile (when viewed from a side perspective). The lateral edge 150 of each trapezoidal block 148 is defined by a tapered surface 152, and the three examples 154, 156 and 158 shown in FIG. 8 represent three different taper angles resulting in radii of curvature (when each bar 142 is bent to the maximum extent allowed by the interacting blocks 148) of 45 degrees, 60 degrees and 80 degrees respectively.

When the bar 142 includes blocks 148 along one of the upper or lower planar surface only, and when the angle of each lateral edge 150 is equal, the bar 142 will bend in a single direction to a single radius of curvature defined by the size and shape (e.g. angle) of the V shape between the lateral edges, as described earlier. In a practical example, one may be confronted with a tee pipe junction (main and lateral extending at 90 degrees) wherein the main is 150 mm in diameter and the lateral is 50 mm in diameter. The radius of curvature of a bending device used in a packer required to navigate such a bend is 60 mm. In another example, where the main is 150 mm and the lateral branch (tee) is 100 mm in diameter, the radius of curvature of the bending device is 100 mm. These radii of curvature enable insertion of the lateral arm such that the arm is able to negotiate the 90 degree pipe bend. Essentially, as the diameter of the lateral gets smaller, then the radius of curvature of the bending device needs to decrease in order to navigate the bend.

According to another embodiment, the bar 142 may include a leading section 160 having a first set of blocks 148 and a trailing section 162 having a second set of blocks 148, as shown in FIG. 9. When a force is applied to cause the device 100 to move towards an obstacle (e.g. a pipe bend) that will cause the device to bend, the leading section 160 will bend to a first radius of curvature defined by an angle of the lateral edge 150 associated with the first set of blocks 148, and the trailing section 162 will bend to a second radius of curvature defined by an angle of the lateral edge tapered surfaces associated with the second set of blocks 148. This different radii of curvature along the length of the bar 142 is also illustrated in FIG. 9.

FIG. 10 shows an example of a bar 142 including a leading section 164 having a first set of blocks 148 connected to the lower surface 144, and a trailing section 166 having a second set of blocks connected to the upper surface 146. In this embodiment, when a force is exerted to cause the device 100 to move towards an obstacle (e.g. a pipe bend) that will cause the device to bend, the leading section 164 will bend to a radius of curvature defined by an angle of the lateral edge 150 associated with the leading set of blocks 148, and subsequently, the trailing section 166 will bend in an opposite direction to a radius of curvature defined by an angle of the lateral edge 150 associated with the trailing set of blocks 148.

The skilled person will appreciate that the device 100 embodied herein is effectively a controlled bending device. The device 100 consists of an elongate member, e.g. a cylindrical rod or flat bar, with trapezoidal blocks attached, the blocks designed such that when the rod/bar bends, the gap between the blocks closes until the adjacent blocks become in contact with each other. When the tapered edges abut, no further bending of the arm is possible. The result is that a very low bending force is required to bend the lateral arm, and once it reaches the point where the blocks are in contact, no further bending or buckling is possible.

The device 100 as described above may be utilised in any application requiring the use of a controlled bending device, and one such application is the controlled bending of a lateral arm 104 associated with a pipe liner installation apparatus 106 for installing a flexible liner 108 into an internal connecting region 110 between a main pipe 112 and a target branch pipe 114. An example of such a pipe liner installation apparatus 106 incorporating a controlled bending device 100 configured in accordance with an embodiment of the present invention is shown in FIGS. 11-17.

Any features of installation apparatus 106 that are the same or similar to features of prior art installation apparatus 10 described in the background of the invention will not be described again for the purpose of brevity. Further, any features associated with apparatus 106 that do not directly affect the controlled bending of the lateral arm 104 may not be described herein.

The lateral arm 104 includes an internal bending device 100 that controls movement and bend of the lateral arm 104, utilising an elongate member 142 as previously described. In the embodiment shown in FIG. 12, the elongate member 142 is configured substantially in accordance with the previously described bar 142 having a planar upper 144 and a planar lower surface 146, and a plurality of blocks 148 attached along a length of the bar 142 to an upper planar surface 144. Through use of the bar 142, which may be made of spring steel for example, and associated blocks 148, the amount of force required to bend the lateral arm 104 is very low up to the point of blocks 148 closing, and then is infinite.

Figure 13:
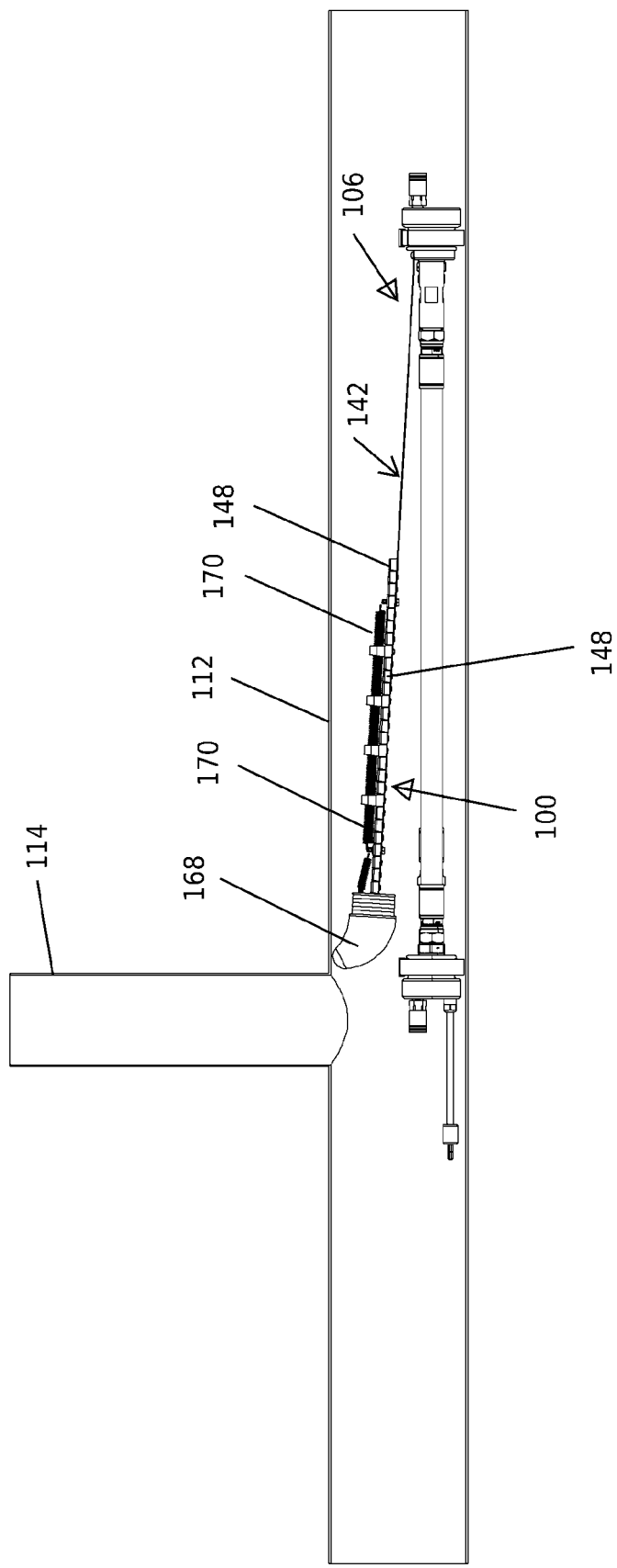
FIGS. 13-15 illustrate successive diagrammatic schematic views of the packer assembly of FIG. 11 being pushed through the main with the lateral arm entering into a connection joint between the main and a lateral pipe.
Figure 14:
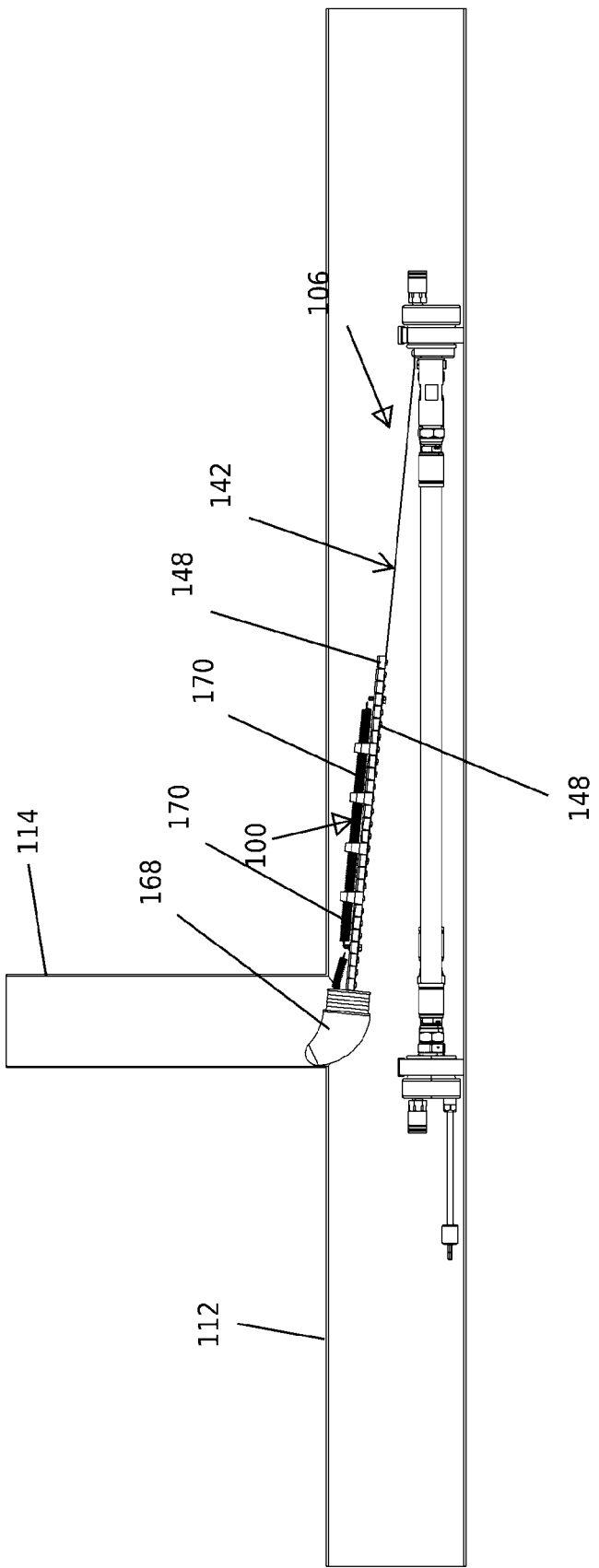
Figure 15:
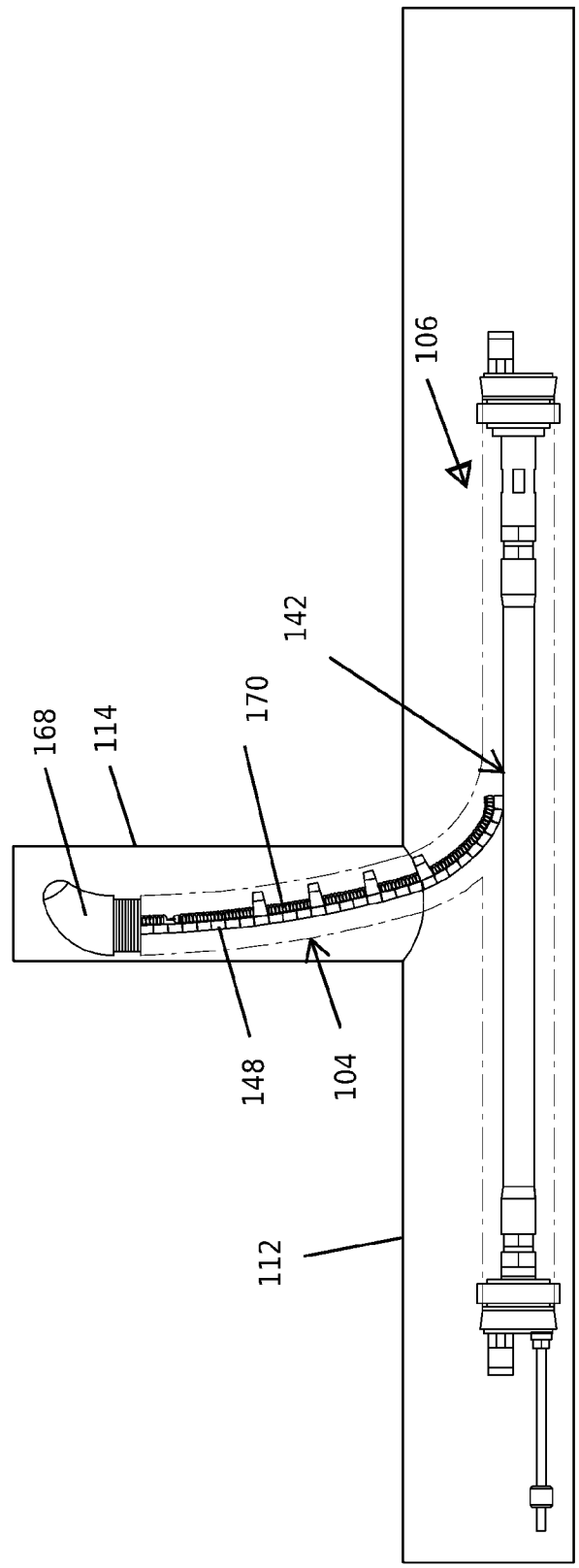

As shown in sequence in FIGS. 13-15, the apparatus 106 is pushed (or alternatively may be pulled) through the main pipe 112 until a protruding member (or nose) 168 located at a distal end of the lateral arm 104 catches in the entrance to the target branch pipe 114, at which point the lateral arm 104 enters and then travels through the target branch pipe 114. To facilitate catching in the entrance to the target branch pipe 114, the lateral arm 104 may be biased. A biasing means 170 may be associated with the internal bending device 100, and in the embodiment shown, the biasing means is in the form of one or more coil springs 170 disposed above the spaced apart blocks 148 in a configuration that creates a non-neutral starting position (i.e. upwards bias) for the bar 142 and hence the lateral arm 104. In this way, in addition to directing and/or controlling the extent of bending of the lateral arm 104, the controlled bending device 100 may also be configured to ensure that the lateral arm 104 catches and enters into the target branch pipe 114.

Figure 11:
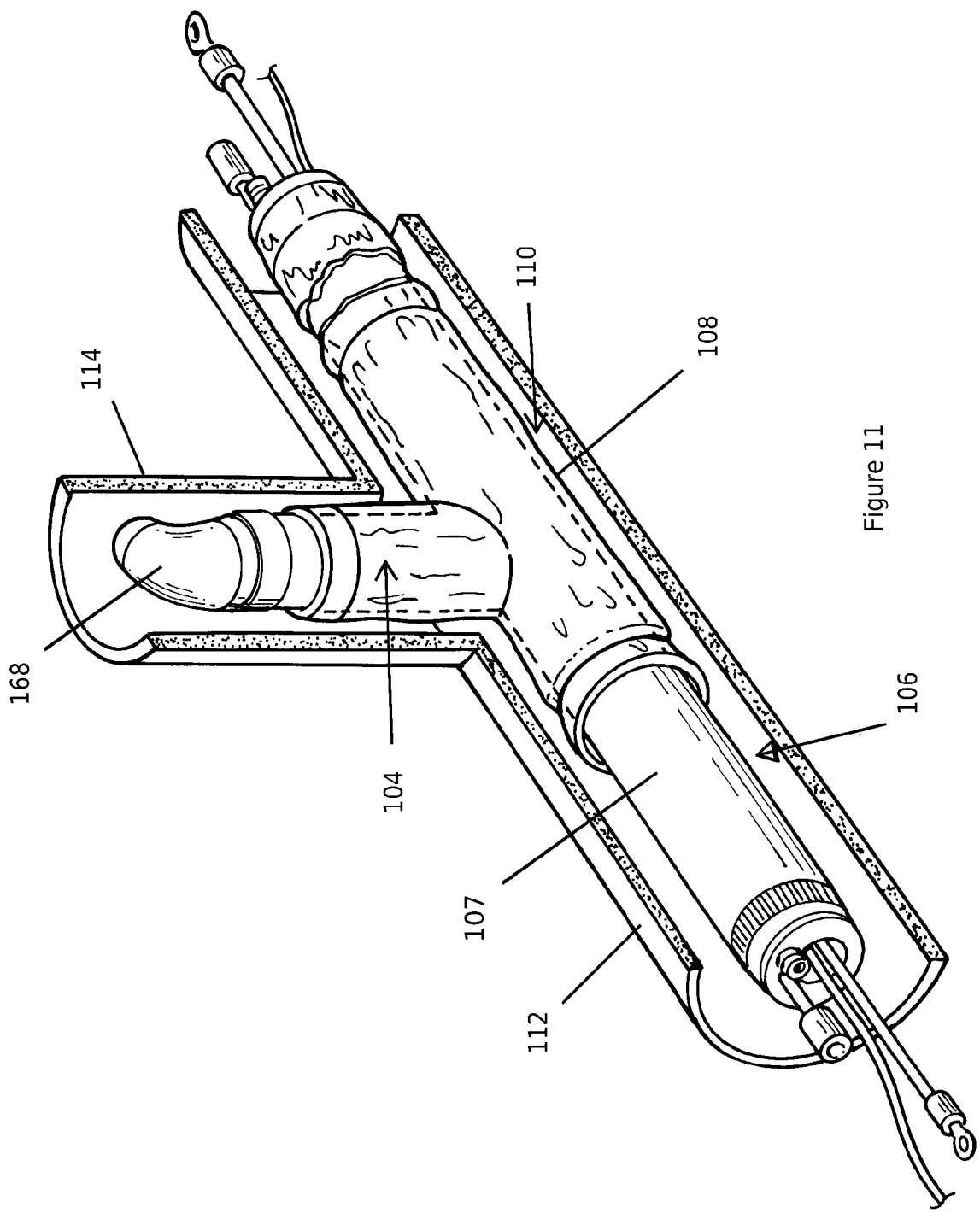
FIG. 11 illustrates a perspective view of a packer assembly including a lateral arm that encloses a controlled bending device configured in accordance with an embodiment of the present invention, the packer assembly in position within a main pipe and a branch pipe.
Figure 12:
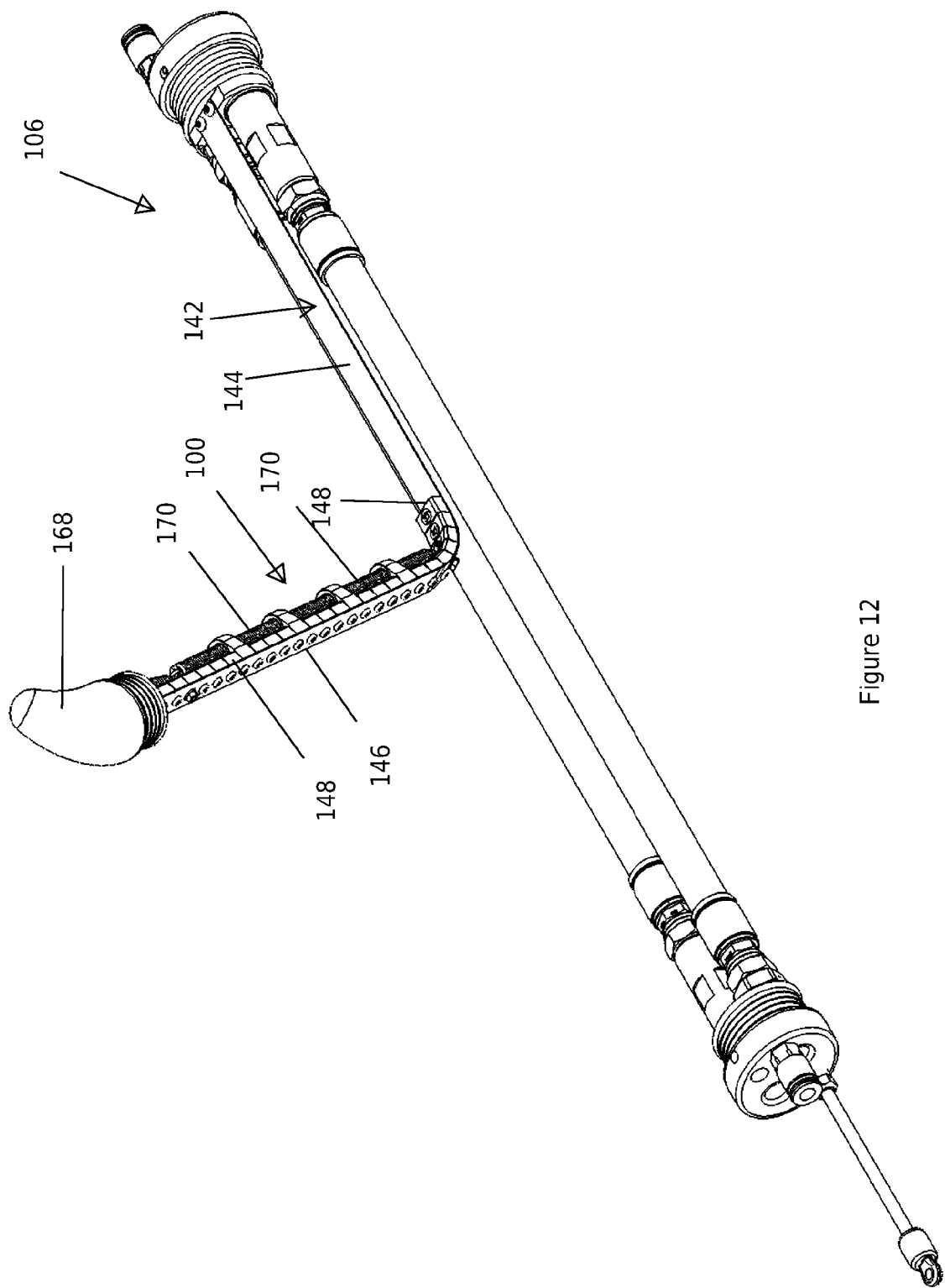
FIG. 12 illustrates a perspective view of the packer assembly of FIG. 11 shown with the inflatable sleeve removed.
Figure 16:
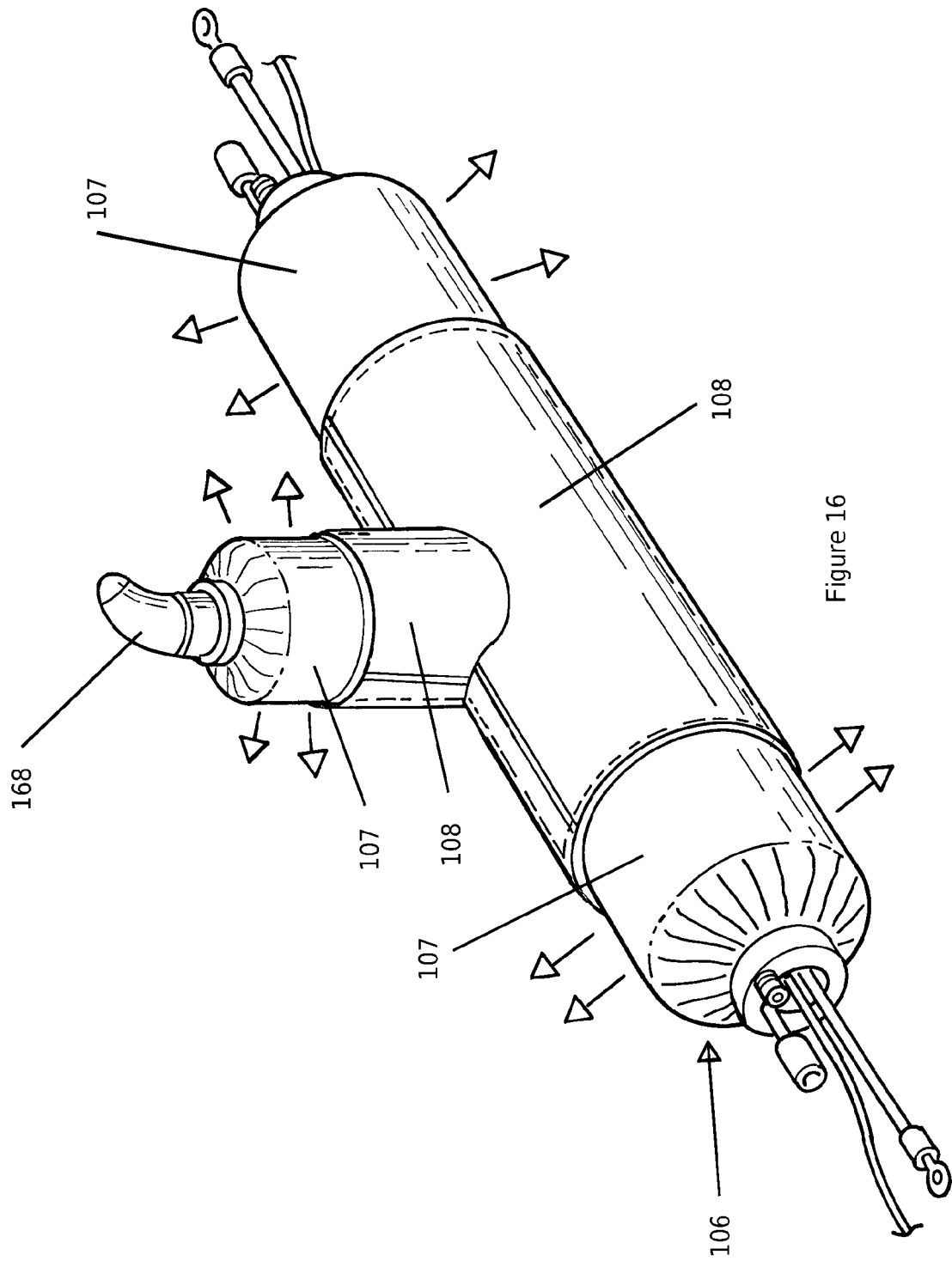
FIG. 16 illustrates a perspective view of the packer assembly of FIG. 11 with the sleeve inflated.
Figure 17:
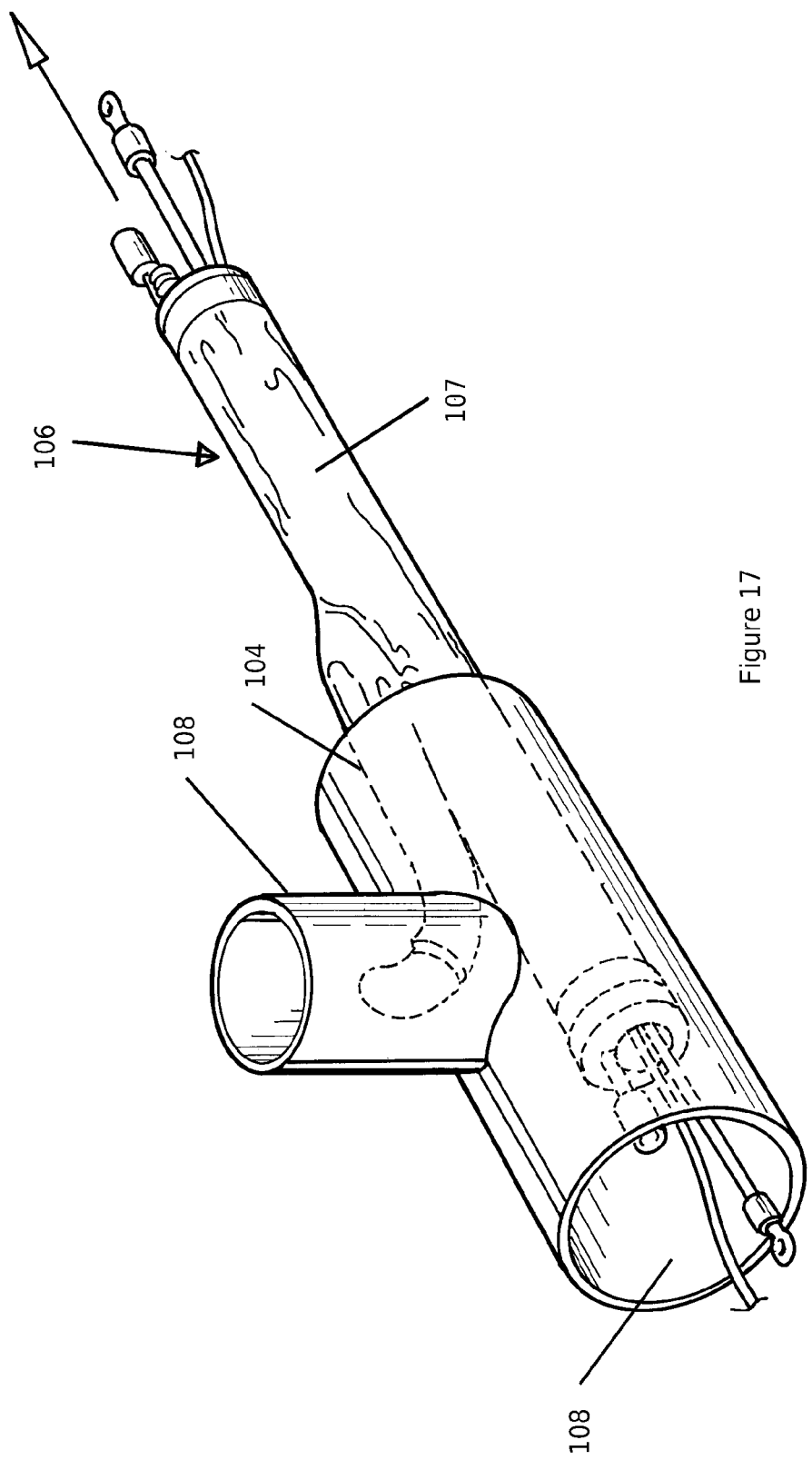
FIG. 17 illustrates a perspective view of the packer assembly of FIG. 11 with the sleeve deflated and the assembly being extracted from the main pipe allowing the liner to remain in place at the connection joint.

Once in the position shown in FIG. 11, the packer assembly 106 may be inflated and the liner 108 is forced against the interior of the main and lateral pipes. FIG. 16 shows the packer assembly 106 and liner 108 with the sleeve 107 inflated. While the inflatable sleeve 107 is expanded to the size of the pipes, the resin is allowed to cure. After curing, the assembly 106 is deflated and can be dislodged from the liner 108 and retrieved from the main 12, as is shown in FIG. 17.

The packer assembly 106 allows operators repairing a connection joint between a main 112 and a lateral pipe 114, such as a house service line, to access the connection joint from a single access chamber of a sewer main. The assembly 106 can be either pushed (or in some instances pulled) into position with the elongate member 100 inside the lateral arm 104 enabling the lateral arm 104 to be maneuvered into position in the lateral pipe 114. FIG. 17 also shows that as the lateral arm 104 of the assembly 106 is progressively withdrawn from the lateral pipe 114 by pulling (or in the alternative pushing), and it is to be understood that additional components and methods are involved in ensuring the correct withdrawal of the apparatus 106 which are not described herein.

It should now be understood that by incorporating the internal bending device 100, the lateral arm 104 will only bend in the direction and degree permitted by the shapes of the blocks 148. For example, if an application required that the lateral arm 104 stop a certain distance into the lateral pipe 114, then the blocks 148 at a certain distance from the distal end of the lateral arm 104 could be made rectangular rather than trapezoidal. The rectangular blocks prevent the lateral arm 104 from further bending after the trapezoidal blocks have compressed to their maximum extent, and hence the lateral arm 104 will not progress any further. The skilled addressee will appreciate that this feature is very beneficial when positioning the lateral arm 104 and ensuring that it reaches the exact home position.

In another example, an application may require the lateral arm to turn to the left or right. The blocks 148 could be designed accordingly to allow a bend in one direction or another, e.g. using the configuration of blocks shown in example 128 of FIGS. 5 and 6 which allow for bending in a single direction. In yet another example, the lateral arm 104 may be required to bend in one direction and then another. Again, the block shape can be configured to control the direction and distance that the lateral arm 104 travels, e.g. using the configuration of blocks shown in FIG. 10.

As described above, the lateral arm 104 achieves junction "catching" by using an upwards bias 170 on the lateral arm 104, causing the nose 168 to catch inside the entrance to the lateral pipe 114 and to then move up through the lateral pipe 114 until the apparatus 106 stops being pushed (or pulled) through the main. The upwards bias 170 serves to elevate the entire length of the lateral arm 104 from the proximal end of the lateral arm 104 where the lateral arm 104 meets the main body of the packer 106 to the distal end of the lateral arm where the nose 168 is located. The upwards bias along the entire arm may be achieved, according to one embodiment, by using a series of pre-loaded springs 170 attached to the "spine" of the lateral arm, i.e. the elongate member (122, 142). The lateral arm 104 configured in this way allows a user to configure the arm in an optimum manner to suit a particular application. For example, one may now judiciously select the spring tension and length of the lateral arm 104, including by pre-loading the arm 104 to exert a particular upwards force (i.e. the force of the distal end of the lateral arm against the roof of the main pipe 112). The weight of other components associated with the lateral arm 104 may reduce the amount of bias and should be taken into account when selecting the spring gauge. It can also be appreciated that alternative spring configurations could be selected to provide more or less upwards force.

The net upwards force of the lateral arm 104 will therefore take into account the upwards force of the internal bending device 100 (provided by the pre-loaded springs 170) as well as the downwards force provided by the mass of the lateral arm 104 and any inherent upwards bias that may exist in the material from which the lateral arm is constructed, e.g. rubber. An optimum upwards force is likely to exist for each application, and the lateral arm bending device 100 allows the optimum to be selected for any combination of lateral arm masses or rubber properties. For example, if the upwards force is too great, it increases the friction resistance and makes the packer more difficult to push/pull along the pipe 112. If the force is too weak, there may be insufficient upwards movement to create a positive location/catch into the junction opening.

Figure 18:
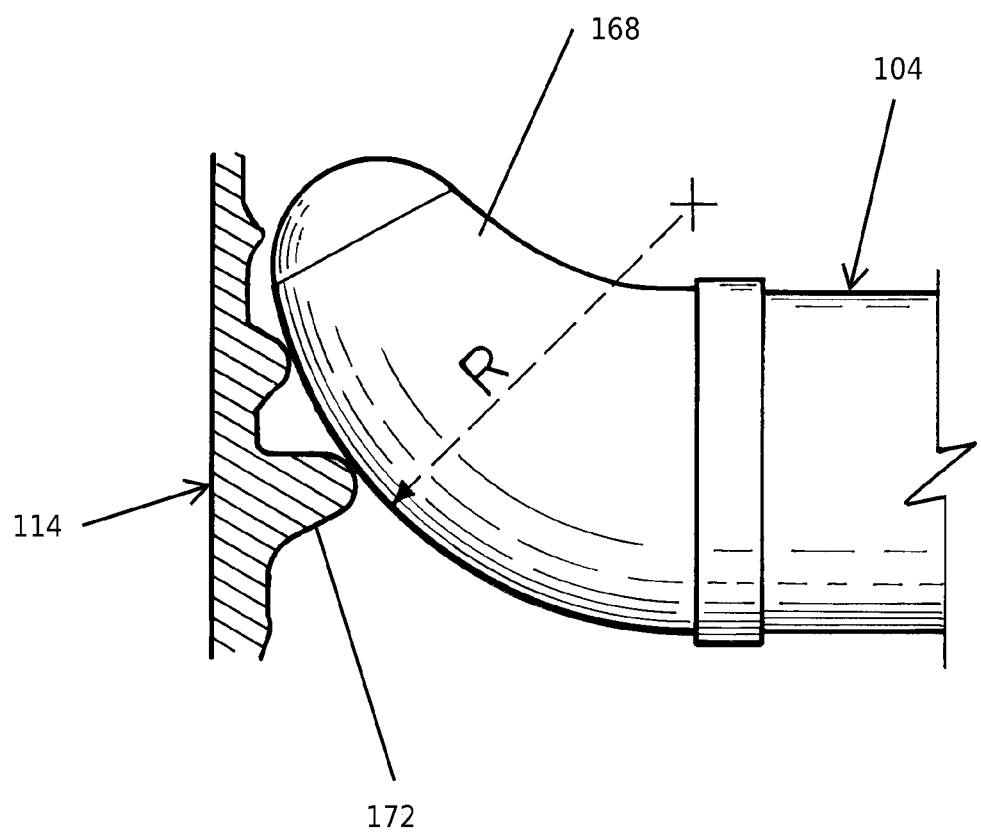
FIG. 18 illustrates an enlarged side view of a nose located at a distal end of the lateral arm of the packer assembly of FIG. 11 according to an embodiment.

FIG. 18 shows an enlarged cross sectional view of the lateral pipe wall 114 and offsets, displacement, cracks and debris 172 that often exist on the inside of the wall 114. The distal end of the lateral arm is the "leading" part of the packer and as such, typically gets caught or snagged. However, the spherical ball shape of the nose 168 is such that it allows the nose and hence the distal end of the lateral arm 104 to "bump" over such obstacles. The contact surface of the nose 168 includes a radius which mimics the principle of a large radius wheel (e.g. caster wheel) which due to its size can roll over offsets without difficulty. Technically, the ability for a wheel to negotiate an offset is related to the diameter of the wheel and the height of the offset. The larger the wheel the larger the offset it can negotiate, and this principle applies here since the nose 168 is designed to effectively be the largest diameter wheel that can fit on the end of the lateral arm 104 without interfering with other constraints.

It should now be appreciated that the embodiments of the present invention allow a packer assembly 106 and an associated lateral arm 104 to be inserted through respective pipes using a minimum of force, with minimal prospects of being caught or snagged during entry, and in a manner that enables the lateral arm 104 to be bent in a desired direction (or directions) and to an exact radius (or radii) of curvature. For example, through testing, it has been shown that a force of less than 1 kilogram (kg) is now required to push/pull the packer into a junction pipe. Further, the radius of curvature can easily be altered for different applications by, for example, making the blocks more trapezoidal to achieve a greater bend radius. In this regard, it is envisaged that operators responsible for repairing pipe junctions will carry multiple internal bending devices 100 to site, the devices 100 configured in a number of different ways so that the operator may select the most appropriate bending device to install into the packer assembly 106 to complete the task at hand.

Figure 2:
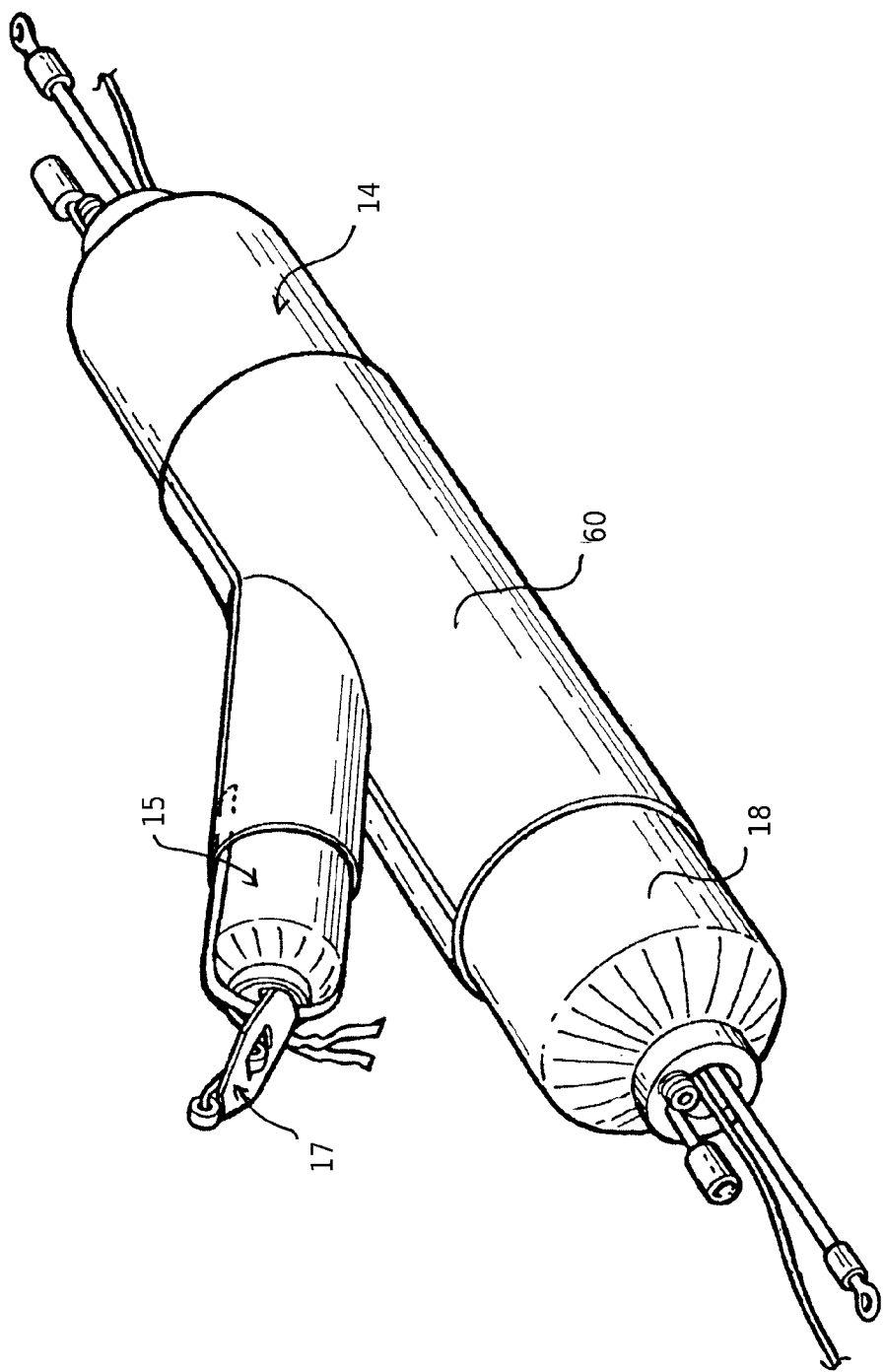
FIG. 2 illustrates a perspective view of the prior art packer assembly of FIG. 1 with the sleeve inflated.
Figure 3:
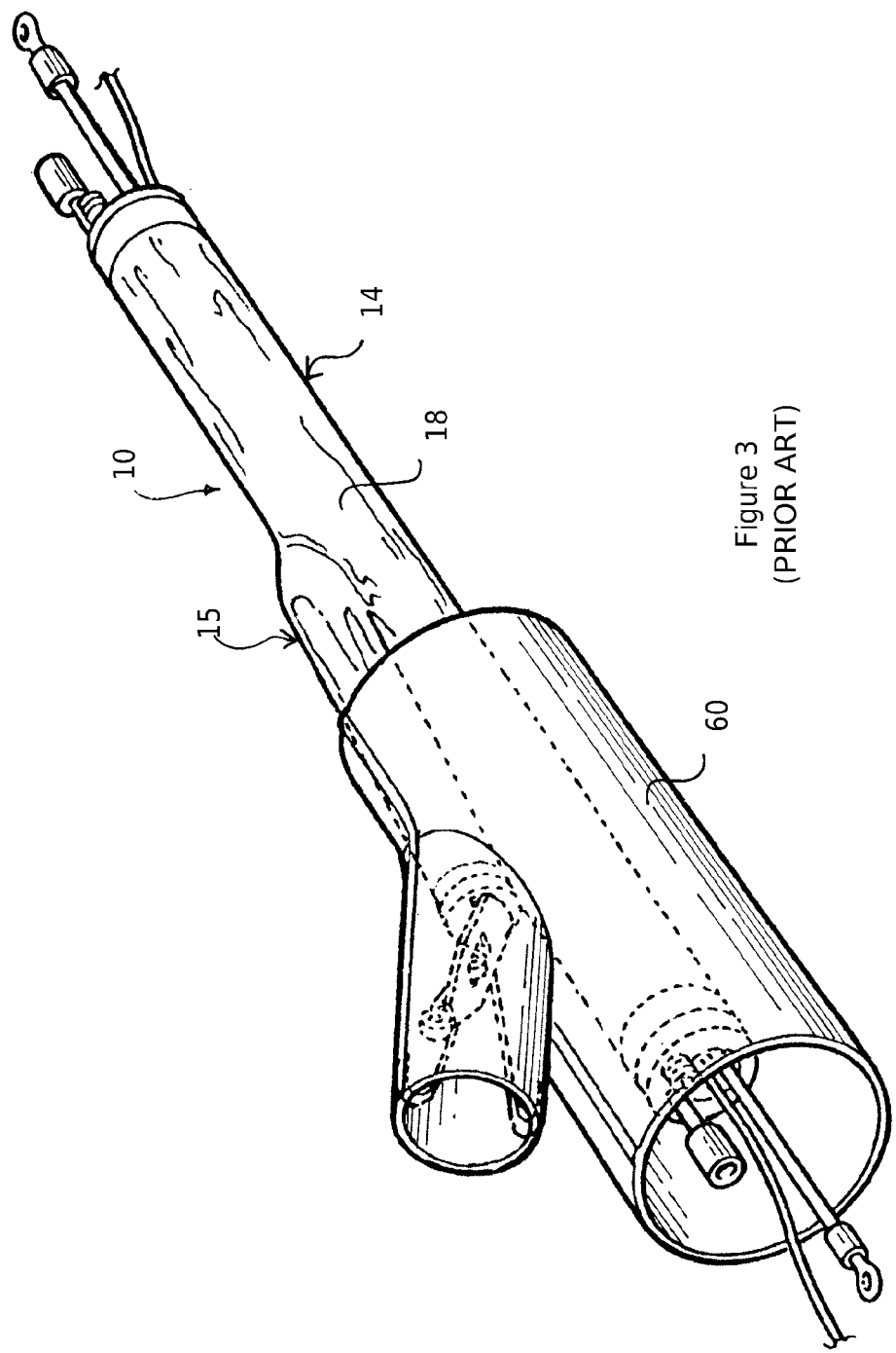
FIG. 3 illustrates a perspective view of the prior art packer assembly of FIGS. 1 and 2 with the sleeve deflated and the assembly being extracted from the main pipe allowing the liner to remain in place at the connection joint between the main and branch pipe.

Unlike the prior art lateral packer 10 shown in FIGS. 1-3 in which the guide means 17 on the distal end of the lateral arm 15 determines where the rest of the packer 10 will follow, the device 100 of the present invention defines where the end of the lateral arm 104 will be directed and to what extent. In other words, the direction and/or degree of bending of the lateral arm 104 is controlled by the internal bending device 100 contained within the lateral arm 104 and not any mechanism that is connected to or extends beyond the distal end of the lateral arm 104.

Throughout this specification and claims which follow, unless the context requires otherwise, the word "comprise", and variations such as "comprises" and "comprising", will be understood to mean the inclusion of a stated feature or step, or group of features or steps, but not the exclusion of any other feature or step, or group of features or steps.

The reference to any prior art in this specification is not, and should not be taken as an acknowledgement, or any suggestion that, the prior art forms part of the common general knowledge.

The claims defining the invention are as follows:

1. An elongate navigation member configured to be moved through a vessel having one or more bends and/or branches, the elongate navigation member including:
    a rod that is flexible in its axial direction to enable a distal free end thereof to navigate into a bend and/or branch as the elongate navigation member is moved through the vessel which causes the distal free end to encounter the bend and/or branch; and
    a plurality of substantially donut-shaped blocks which journal around and are spaced lengthwise along the rod and configured such that adjacent blocks, during bending of the rod which is caused when the bend and/or branch of the vessel is encountered, interact to control a degree and/or direction of bending of the rod,
    wherein one or more of the blocks includes a tapered surface that extends a minimum of 180 degrees and a maximum of 360 degrees around the rod and thereby allows the rod to bend, from a starting position, in a direction that causes adjacent tapered surfaces to rotate towards one another until the tapered surfaces of adjacent blocks abut, at which point a maximum degree of bending is achieved, wherein said maximum degree of bending is achieved at a radius of curvature that is defined by an angle of the interacting tapered surfaces when in said starting position, and wherein a force is required to bend the rod up the radius of curvature, at which point the force is infinite such that no further bending or buckling of the rod is possible.

2. An elongate navigation member according to claim 1, wherein:
    the tapered surface journals 360 degrees around the rod such that the elongate member is capable of three-dimensional bending, or the tapered surface journals 270 degrees around the rod such that the elongate member is capable of bending in two dimensions, or the tapered surface journals 180 degrees around the rod such that the elongate member is capable of bending in one dimension, the direction of bending based upon an orientation of the donut-shaped block about the rod.

3. An elongate navigation member according to claim 2, wherein the orientation of each donut-shaped block about the rod is adjustable by rotating the block about the rod.

4. An elongate navigation member according to claim 1, further including biasing means that cause the elongate navigation member to be biased in a direction that provides a lead-in for the distal free end into the bend and/or branch under the external action of pushing or pulling of the elongate member lengthwise with respect to the vessel, wherein the biasing means is one or more springs extending between two blocks of the plurality of blocks associated with the elongate member.

5. A bending device for use in a pipe liner installation apparatus for installing a flexible liner into an internal connecting region between a main pipe and a target branch pipe, the bending device associated with a lateral arm of the pipe liner installation and including an elongate navigation member configured in accordance with claim 1.

6. A pipe liner installation apparatus for installing a flexible liner into an internal connecting region between a main pipe and a target branch pipe, the apparatus deployable from within the main pipe and including:
an elongate body;
a lateral arm including:
a proximal end connected to the body,
a distal free end, and
a bending device including:
an elongate member extending between the proximal and distal ends, the elongate member being flexible in its axial direction to enable the distal free end of the lateral arm to navigate a bend into the target branch pipe during pushing or pulling of the body lengthwise with respect to the main pipe which causes the distal free end of the lateral arm to encounter the target branch pipe, and
a plurality of blocks that are spaced lengthwise along the elongate member and configured such that adjacent blocks, during bending of the elongate member which is caused when the target branch pipe is encountered, interact to control a degree and/or direction of bending of the lateral arm,
wherein one or more of the blocks includes a tapered surface configured to allow the elongate member to bend in a direction that causes the tapered surface to substantially rotate towards an adjacent block; and
an inflatable sleeve assembly extending at least partially over the body and the lateral arm.

7. A pipe liner installation apparatus according to claim 6, wherein each adjacent block also includes a tapered surface and thereby allows the elongate member to bend, from a starting position, in a direction that causes adjacent tapered surfaces to rotate towards one another until the tapered surfaces abut, at which point a maximum degree of bending is achieved, wherein said maximum degree of bending is achieved at a radius of curvature that is defined by an angle of the interacting tapered surfaces when in said starting position, and wherein a force is required to bend the elongate member up to the radius of curvature, at which point the force is infinite such that no further bending or buckling of the elongate member is possible.

8. A pipe liner installation apparatus according to claim 7, wherein the elongate member is a rod and each block is substantially donut-shaped and journals around the rod, and the tapered surface associated with each donut-shaped block extends a minimum of 180 degrees and a maximum of 360 degrees around the rod.

9. A pipe liner installation apparatus according to claim 8, wherein:
the tapered surface journals 360 degrees around the rod such that the elongate member is capable of bending in all directions, or
the tapered surface journals 270 degrees around the rod such that the elongate member is capable of bending in two dimensions, or
the tapered surface journals 180 degrees around the rod such that the elongate member is capable of bending in one dimension, on the direction of bending based upon an orientation of the donut-shaped block about the rod.

10. A pipe liner installation apparatus according to claim 9, wherein the orientation of each donut-shaped block about the rod is adjustable by rotating the block about the rod.

11. A pipe liner installation apparatus according to claim 7, wherein the elongate member is a bar having a planar upper and lower surface, wherein each block is connected to one or both of the upper and lower surfaces and has a substantially trapezoidal shape when viewed from a side perspective, wherein:
the bar includes blocks along the upper or lower surface only, and the angle of tapered surfaces associated with adjacent blocks is equal, such that when a bending force is applied the bar will bend in a single direction to a single radius of curvature defined by the angle of the tapered surfaces, or
the bar includes a leading section having a first set of blocks and a trailing section having a second set of blocks, such that when a bending force is applied the leading section will bend to a first radius of curvature defined by an angle of the tapered surfaces associated with the leading set of blocks, and the trailing section will bend to a second radius of curvature defined by an angle of the tapered surfaces associated with the trailing set of blocks, wherein the first radius of curvature is different to the second radius of curvature, or
the bar includes a leading section having a first set of blocks connected to the upper surface and a trailing section having a second set of blocks connected to the lower surface, such that when a bending force is applied the leading section will bend to a radius of curvature defined by an angle of the tapered surfaces associated with the leading set of blocks, and subsequently, the trailing section will bend in an opposite direction to a radius of curvature defined by an angle of the tapered surfaces associated with the trailing set of blocks.

12. A pipe liner installation apparatus according to claim 6, wherein the bending device further includes one or more biasing means that cause the elongate member to be biased in a direction that causes the distal free end of the lateral arm to provide a lead-in for the distal free end of the lateral arm into the target branch pipe under the external action of pushing or pulling of the body lengthwise with respect to the main pipe, wherein the one or more biasing means is one or more springs extending between two blocks of the plurality of blocks associated with the elongate member.

13. A pipe liner installation apparatus according to claim 6, wherein a distal end of the lateral arm further includes a protruding nose having a contact surface shaped to facilitate movement over obstacles encountered by the distal end of the lateral arm along an inside wall of the main and/or target branch pipes, wherein the contact surface includes a radius of curvature.

14. A pipe liner installation apparatus according to claim 6, wherein the inflatable sleeve assembly includes a single bifurcated sleeve substantially covering both the body and the lateral arm, and the liner includes textile material impregnable with resin.

15. A method of installing a flexible liner into a junction between a main pipe and a branch pipe, the method including the steps of:
fitting the flexible liner over an installation apparatus configured in accordance with claim 6; inserting the installation apparatus and fitted liner into the main pipe via an access opening;
pushing or pulling the installation apparatus and fitted liner along the main pipe towards an entrance to the branch pipe;
further pushing or pulling the installation apparatus and fitted liner along the main pipe so that the lateral arm is driven through the entrance of the branch pipe into the branch pipe, wherein the degree and/or direction of bending of the lateral arm when navigating the bend into the branch pipe is based upon the configuration of the plurality of blocks and interaction therebetween;

inflating the sleeve so as to press the fitted liner against the inner walls of both the main pipe and the branch pipe until the liner is fixed in place;

deflating the sleeve; and withdrawing the installation apparatus from within the liner fixed within the branch and main pipes.

16. A method of installing a flexible liner according to claim 15, further including:

impregnating the liner with a resin, the resin curable to form a bond between the liner and the inner walls of both the main pipe and the branch pipe, wherein the impregnating step occurs before said inserting step, and rotating the main body thereby rotating the lateral arm so as to align it with an entrance to the branch pipe, wherein the rotating step occurs before said further pushing or pulling step.

17. A packer assembly for repairing a connection joint between two pipes, said packer assembly adapted to be inserted into said joint and adjacent portions of said pipes, said packer assembly including:

a flexible elongate main body portion having a first end and a second end;

a flexible lateral arm portion with a proximal end connected to the main body portion intermediate the ends of the main body portion and a distal free end extending outwardly from said main body portion intermediate the ends of the main body portion, the lateral arm further including:

a bending device including:

an elongate member extending between the proximal and distal ends, the elongate member being flexible in its axial direction and biased to enable the distal free end of the lateral arm to navigate a bend into the target branch pipe during pushing or pulling of the body lengthwise with respect to the main pipe which causes the distal free end of the lateral arm to encounter the target branch pipe, and a plurality of blocks that are spaced lengthwise along the elongate member and configured such that adjacent blocks, during bending of the elongate member which is caused when the target branch pipe is encountered, interact to control a degree and/or direction of bending of the lateral arm, wherein one or more of the blocks includes a tapered surface configured to allow the elongate member to bend in a direction that causes the tapered surface to substantially rotate towards an adjacent block, and a biasing means that cause the elongate member and hence the lateral arm to be biased in a direction that causes a distal end of the lateral arm to provide a lead-in for the distal end of the lateral arm into the target branch pipe during pushing or pulling of the body lengthwise with respect to the main pipe; and an inflatable sleeve means extending at least partially over the main body portion and the lateral arm portion, said packer assembly being adapted to have a pipe liner fitted over said inflatable sleeve means, said pipe liner being adapted to be applied to interior surfaces of said pipes and said connection joint when said sleeve means is inflated after the packer assembly is inserted into position, and after said pipe liner has been applied to the interior surfaces, said packer assembly is adapted to be removed, wherein said packer assembly is inserted into one of the pipes with the lateral arm portion being substantially side by side with the main body portion, the packer assembly being pushed or pulled towards said connection joint whereby the lateral arm portion is guided into the other pipe by the biased lateral arm to thereby change its orientation to that of the orientation of the pipe when the lateral arm portion is in position, the inflatable sleeve means is inflated such that the pipe liner abuts against the interior surfaces of the connection joint and pipes.

18. An elongate navigation member configured to be moved through a vessel having one or more bends and/or branches, the elongate navigation member including:

a bar having a planar upper and lower surface and that is flexible in its axial direction to enable a distal free end thereof to navigate into a bend and/or branch as the elongate navigation member is moved through the vessel which causes the distal free end to encounter the bend and/or branch; and a plurality of blocks each having a substantially trapezoidal shape when viewed from a side perspective, the plurality of blocks connected to one or both of the upper and lower surfaces of the bar and that are spaced lengthwise along the bar such that adjacent blocks, during bending of the bar which is caused when the bend and/or branch of the vessel is encountered, interact to control a degree and/or direction of bending of the bar;

wherein each adjacent block includes a tapered surface and thereby allows the bar to bend, from a starting position, in a direction that causes adjacent tapered surface to rotate towards one another until the tapered surfaces of the adjacent blocks abut, at which point a maximum degree of bending is achieved, wherein said maximum degree of bending is achieved at a radius of curvature that is defined by an angle of the interacting tapered surfaces when in said starting position, and wherein a force is required to bend the bar up to the radius of curvature, at which point the force is infinite such that no further bending or buckling of the bar is possible;

wherein:

the bar includes blocks along the upper or lower surface only, and the angle of tapered surfaces associated with adjacent blocks is equal, such that when a bending force is applied the bar will bend in a single direction to a single radius of curvature defined by the angle of the tapered surfaces, or the bar includes a leading section having a first set of blocks and a trailing section having a second set of blocks, such that when a bending force is applied the leading section will bend to a first radius of curvature defined by an angle of the tapered surfaces associated with the leading set of blocks, and the trailing section will bend to a second radius of curvature defined by an angle of the tapered surfaces associated with the trailing set of blocks, wherein the first radius of curvature is different to the second radius of curvature, or the bar includes a leading section having a first set of blocks connected to the upper surface, and a trailing section having a second set of blocks connected to the lower surface, such that when a bending force is applied the leading section will bend to a radius of curvature defined by an angle of the tapered surfaces associated with the leading set of blocks, and subsequently, the trailing section will bend in an opposite direction to a radius of curvature defined by an angle of the tapered surfaces associated with the trailing set of blocks.

\* \* \* \* \*